US012686617B2

(12) United States Patent
Novodchuk et al.

(10) Patent No.: US 12,686,617 B2
(45) Date of Patent: Jul. 21, 2026

(54) BORON AND NITROGEN CO-DOPED GRAPHENE OXIDE GELS AND USES THEREOF

(71) Applicant: BIOGRAPH SENSE INC., Kitchener (CA)

(72) Inventors: Inna Novodchuk, Kitchener (CA); Mustafa Yavuz, Waterloo (CA); Michal Bajcsy, Waterloo (CA)

(73) Assignee: BIOGRAPH SENSE INC., Kitchener (CA)

( * ) Notice: Subject to any disclaimer, the term of this patent is extended or adjusted under 35 U.S.C. 154(b) by 1043 days.

(21) Appl. No.: 17/854,216

(22) Filed: Jun. 30, 2022

(65) Prior Publication Data

US 2023/0011500 A1 Jan. 12, 2023

Related U.S. Application Data

(60) Provisional application No. 63/216,599, filed on Jun. 30, 2021.

(51) Int. Cl.
*C01B 32/198* (2017.01)
*C01B 32/184* (2017.01)

(52) U.S. Cl.
CPC .......... *C01B 32/198* (2017.08); *C01B 32/184* (2017.08); *C01P 2002/52* (2013.01)

(58) Field of Classification Search
CPC ... C01B 32/198; C01B 32/184; C01P 2002/52
See application file for complete search history.

(56) References Cited

U.S. PATENT DOCUMENTS

2013/0307029 A1* 11/2013 Xu ...................... G01N 27/4145
257/253
2015/0280248 A1* 10/2015 Tour ...................... C01B 32/198
502/180

OTHER PUBLICATIONS

Ibrahim K. H., Irannejad M., Hajialamdari M., Ramadhan A., Musselman K. P., Sanderson J., Yavuz M. (2016). A Novel Femtosecond Laser-Assisted Method for the Synthesis of Reduced Graphene Oxide Gels and Thin Films with Tunable Properties. Adv. Mater. Interfaces, 3: 1500864. doi: 10.1002/admi.201500864.

K. H. Ibrahim, M. Irannejad, B. Wales, J. Sanderson, M. Yavuz, K. P. Musselman, Advanced Optical Materials 2018, 6, 1701365. https://doi.org/10.1002/adom.201701365.

K. Ibrahim. Femtosecond Laser Interaction with Graphene Oxide Aqueous Solution. A thesis presented to the University of Waterloo in fulfilment of the thesis requirement for the degree of Master of Applied Science m Mechanical Engineering. Waterloo, Ontario, Canada, 2015.

I. Novodchuk et al. An ultrasensitive heart-failure BNP biosensor using B/N co-doped graphene oxide gel FET. Biosensors and Bioelectronics 180 (2021) 113114. journal homepage: http://www.elsevier.com/locate/bios.

I. Novodchuk et al. B/N co-doped graphene oxide gel with extremely-high mobility and ION/IOFF for large-area field effect transistors. Carbon 158 (2020) 624e630. journal homepage: www.elsevier.com/locate/carbon.

* cited by examiner

*Primary Examiner* — Stuart L Hendrickson
(74) *Attorney, Agent, or Firm* — Alexandre Daoust; Norton Rose Fulbright Canada LLP

(57) ABSTRACT

The gel made of graphene oxide co-doped with boron nitrogen can be functionalized with a receptor, can be passivated by a passivation agent, and can have particular expressions of bonds to favor charge carrier mobility. The gel can be used in the context of a sensor via the interaction between the receptor and an analyte to be detected.

10 Claims, 15 Drawing Sheets

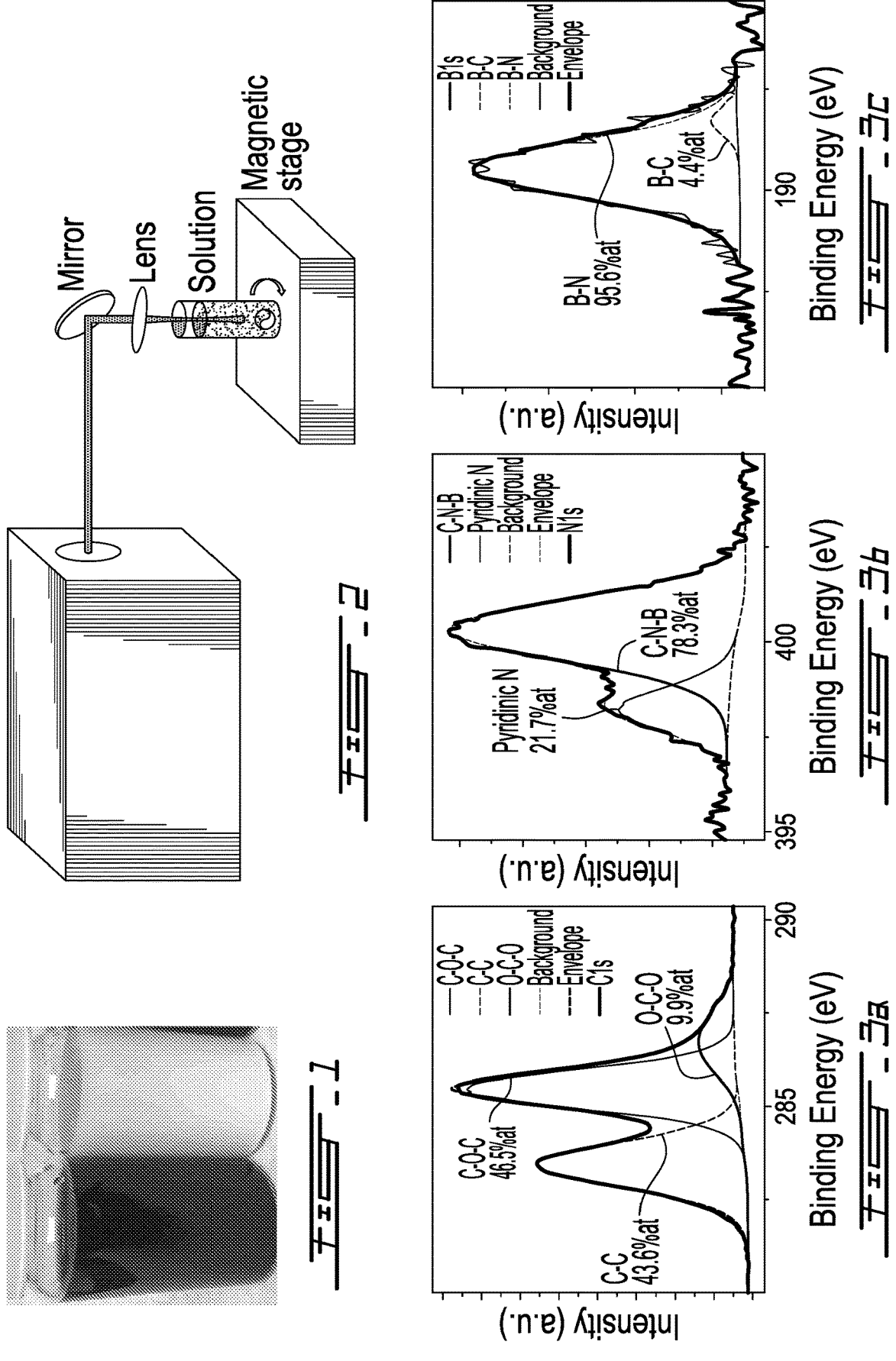

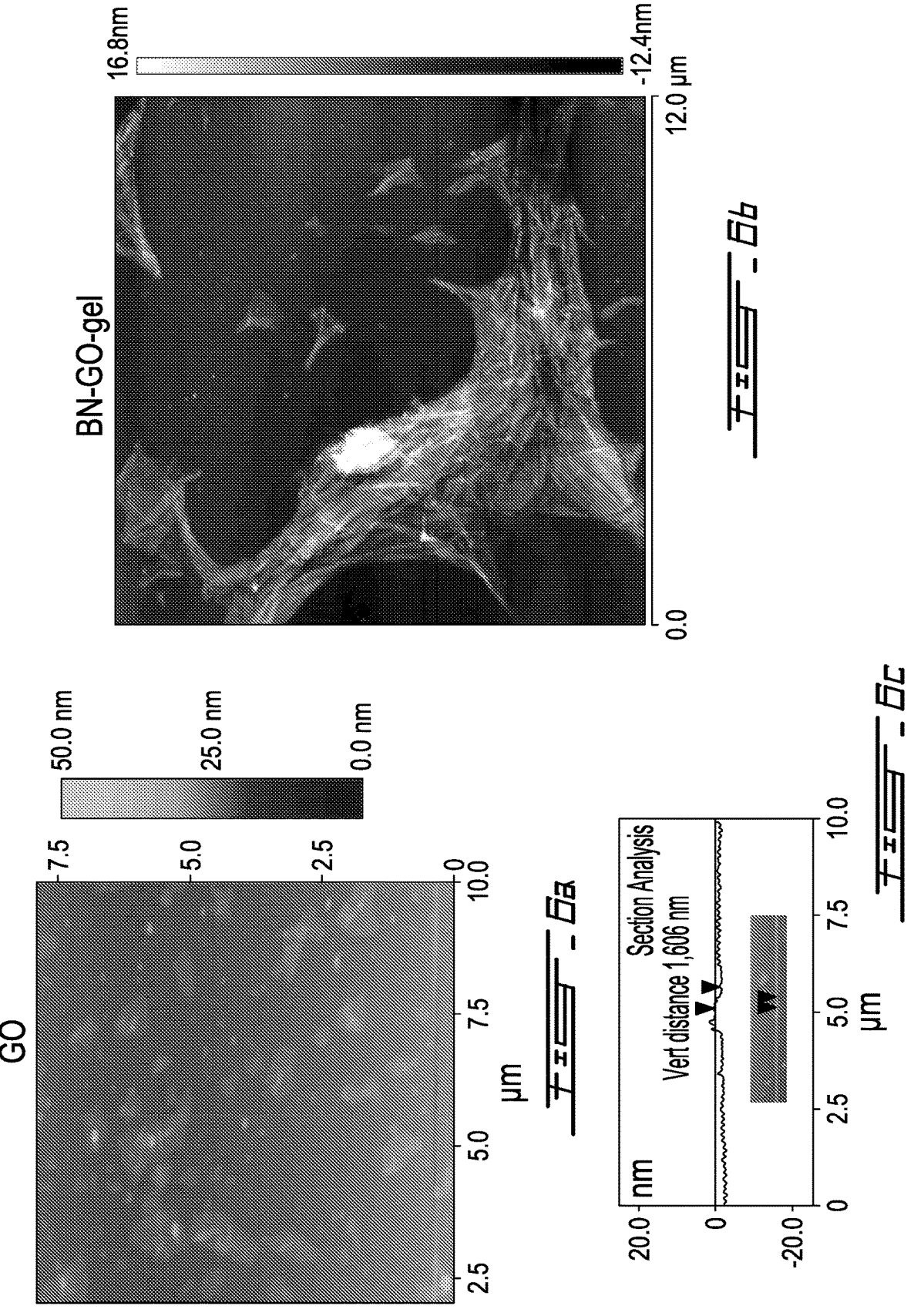

$V_{BG}$

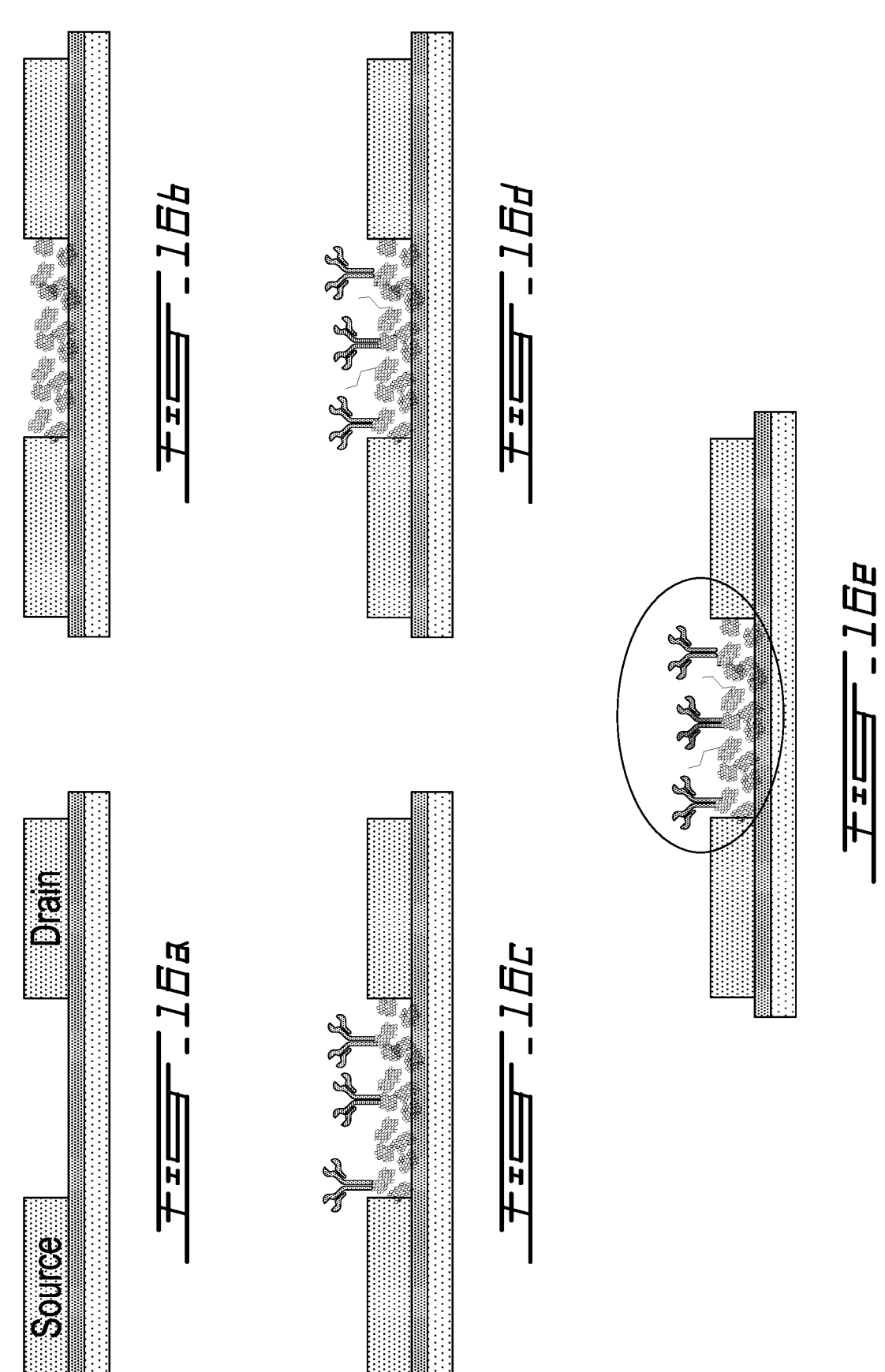

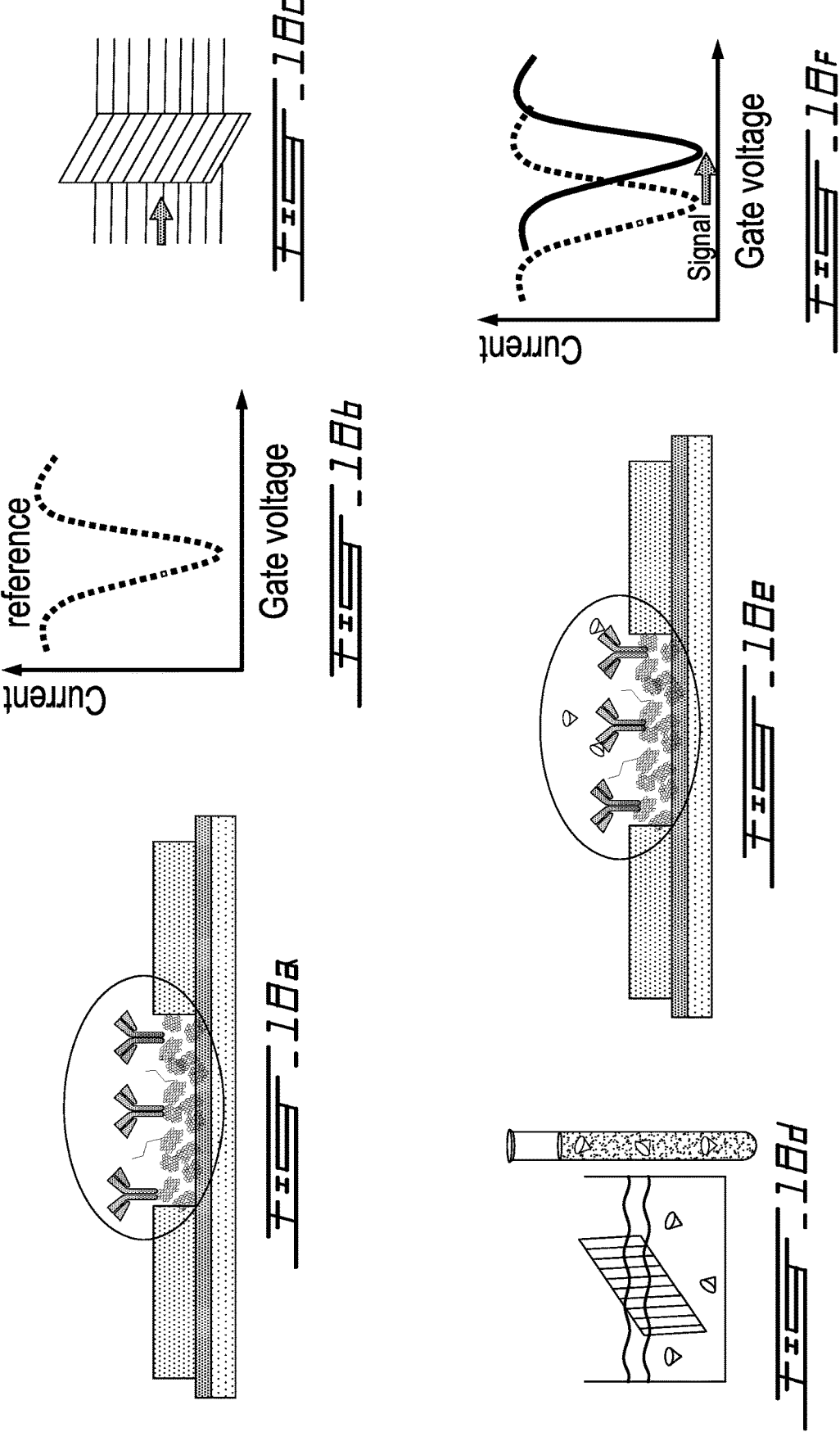

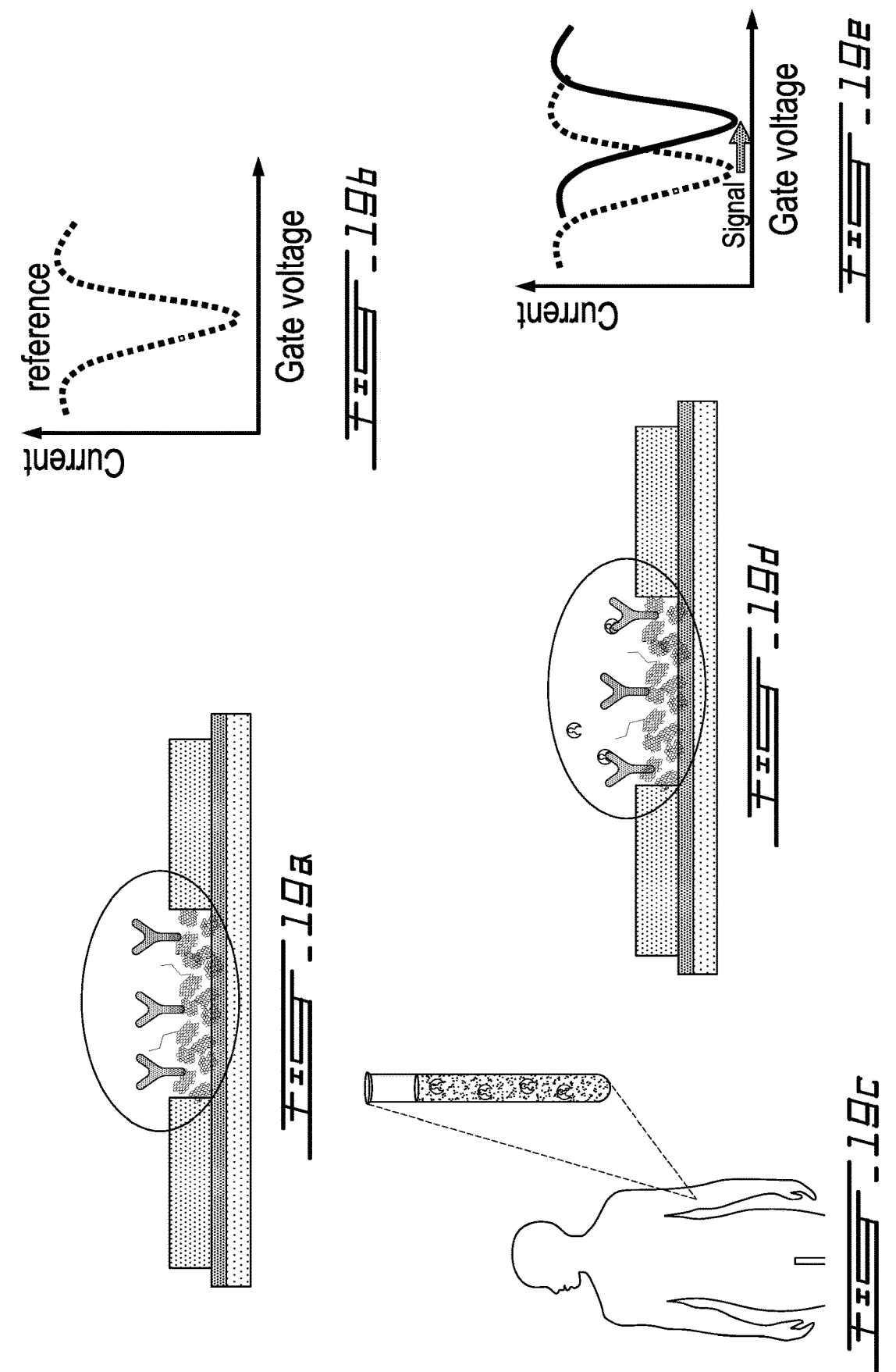

BORON AND NITROGEN CO-DOPED GRAPHENE OXIDE GELS AND USES THEREOF

CROSS REFERENCE TO A RELATED APPLICATION

The present application claims the priority of U.S. provisional application No. 63/216,599 which is incorporated herein by reference in its entirety.

TECHNICAL FIELD

The present application generally relates to the field of nanostructured gels, methods of making same and methods of using same.

BACKGROUND

Various uses exist for nano-bioelectronics and these uses span industries such as healthcare, veterinary, agriculture, water and environment monitoring, and food quality control.

Gels can be used in other uses than nano-bioelectronics. There always remains room for improvement.

SUMMARY

In an aspect, the disclosure describes a laser ablation process for the fabrication of a boron and nitrogen co-doped graphene oxide gel (BN-GO gel). A field effect transistor (FET) biosensor using the BN-GO gel as the channel material gives higher charge carrier mobility and ON and OFF current ratios compared with the state-of-the-art.

In an aspect, the term 'biosensor' is used to describe the use of the BN-GO gel FET towards the sensing of biological molecules, such as nucleic acids, proteins, lipids, glycoproteins, glycolipids and the like.

In particular, a receptor can be present in the gel to specifically react with an analyte while avoiding reaction with other materials than the analyte. In the context of a biosensor, the analyte will be a biological molecule and the receptor, being adapted to react with the specific biological molecule to be tested, can be referred to as a bioreceptor.

The gels presented therein can be used, amongst other potential uses, in a biosensor which is adapted to detect the presence or absence of an analyte. Depending on the embodiment, the biosensor can be a field effect transistor (where the gel can be used as the channel), an electrochemical sensor, a mechanical sensor, an optical sensor, or any other suitable sensor platform.

A passivation agent may be used in the gel to increase sensitivity to particular molecules. The passivation agent may be selected to block COOH bonds for instance, or, in a transistor application, the passivation agent may be a dielectric material for instance.

In another aspect, the disclosure describes a method to functionalize the BN-GO gel FET biosensor with bioreceptors without the use of a linker, thus keeping the bioreceptor-biomarker recognition reaction close to the channel surface.

In another aspect, the disclosure provides a method to reduce Debye screening and noise from sample charges by providing a buffer and passivation combination.

In another aspect, the disclosure provides a method to use the same BN-GO gel FET for different fields (healthcare, veterinary, agriculture, water and environment, and food quality control) by providing the method of the corresponding bioreceptor functionalization.

In accordance with another aspect, there is provided a gel made of graphene oxide co-doped with boron nitrogen, the gel being functionalized with a receptor.

In accordance with another aspect, there is provided a gel made of graphene oxide co-doped with boron nitrogen and having a passivation agent.

In accordance with another aspect, there is provided a gel made of graphene oxide co-doped with boron nitrogen and having at least 50%, preferably at least 80% B—N bonds.

In accordance with another aspect, there is provided a gel made of graphene oxide co-doped with boron nitrogen and having less than 40%, preferably less than 10% B—C bonds.

In accordance with another aspect, there is provided a gel made of graphene oxide co-doped with boron nitrogen and having less than 4%, less than 3%, less than 2%, less than 1% or 0% B—$C_2O$ bonds.

In accordance with another aspect, there is provided a gel made of graphene oxide co-doped with boron nitrogen and having at least 5%, at least 10%, preferably at least 15% pyridinic N bonds.

In accordance with another aspect, there is provided a gel made of graphene oxide co-doped with boron nitrogen and having less than 70%, preferably less than 60% C—N—B bonds.

In accordance with another aspect, there is provided a gel made of graphene oxide co-doped with boron nitrogen and having less than 20%, less than 15%, less than 10%, less than 5%, less than 2%, less than 1%, preferably 0% pyrrolic N bonds.

In accordance with another aspect, there is provided a gel made of graphene oxide co-doped with boron nitrogen and having a combination of any two or more of the bond specifications as described herein.

In one aspect, there is provided a gel made of graphene oxide co-doped with boron nitrogen, the gel being functionalized with a receptor. In one aspect, there is provided a field effect transistor having a channel formed of the gel. In one embodiment, the receptor is a bioreceptor.

In one aspect, there is provided a method of detecting a presence of an analyte adapted to the receptor in a sample, the method comprising applying the sample onto the gel of the present disclosuring, measuring a property of the gel during contact with the sample, and determining the presence of the analyte in the sample based on the measured property.

In one aspect there is provided a gel made of graphene oxide co-doped with boron nitrogen and having a passivation agent. In one aspect, there is provided a field effect transistor having channel formed of that gel. In one embodiment, the passivation agent is configured to block COOH bonds. In one embodiment, the passivation agent is a dielectric. In one embodiment, the gel of is functionalized with a receptor.

In one aspect, there is provided a method of detecting a presence of an analyte adapted to the receptor in a sample, the method comprising applying the sample onto the gel of the present disclosure, measuring a property of the gel during contact with the sample, and determining the presence of the analyte in the sample based on the measured property.

In one aspect, there is provided a gel made of graphene oxide co-doped with boron nitrogen and having at least 50% B—N bonds, less than 40% B—C bonds, less than 4% B—$C_2O$ bonds, at least 5% Pyridinic N bonds, less than 70% C—N—B bonds, less than 20% Pyrrolic N bonds. In some embodiments, the gel comprises at least 70% preferably at least 80% B—N bonds. In some embodiments, the gel comprises less than 3%, less than 2%, less than 1%, less than 0.5% or 0% B—C$_2$O bonds. In some embodiments, the gel comprises at least 15% Pyridinic N bonds. In some embodiments, the gel comprises less than 60% C—N—B bonds. In some embodiments, the gel comprises less than 15%, less than 10%, less than 5%, less than 3%, less than 1%, less than 0.5% or 0% Pyrrolic N bonds. In some embodiments, the gel comprises a carrier mobility of between 10$^6$ cm$^2$ V$^{-1}$ s$^{-1}$ and 10$^5$ cm$^2$ V$^{-1}$ s$^{-1}$. In some embodiments, the gel comprises an ON and OFF current ratio of between 10$^8$ and 10$^5$ cm$^2$V$^{-1}$ s$^{-1}$. In some embodiments, the gel comprises between 10$^8$ cm$^2$ V$^{-1}$ s$^{-1}$ and 10$^6$ cm$^2$ V$^{-1}$ s$^{-1}$. In some embodiment the gel is functionalized with a receptor.

In one aspect, there is provided a field effect transistor having channel formed of the gel of the present disclosure as defined herein.

In one aspect, there is provided a method of detecting a presence of an analyte adapted to the receptor in a sample, the method comprising applying the sample onto the gel of the present disclosure, measuring a property of the gel during contact with the sample, and determining the presence of the analyte in the sample based on the measured property.

In one aspect, there is provided a biosensing system including a FET-type device where the channel is made of a graphene oxide gel which is co-doped with boron nitrogen, wherein known as BN-GO gel, and to which bioreceptors are added. The BN-GO gel contains an abundance of COOH functional groups. The amine-terminated bioreceptors functionalizing themselves to the gel via carboxyl and amine reaction, and a passivation agent is added. The system can interrogate the electrical changes of the FET-type device and make a determination as to the nature of a sample placed in contact with the bioreceptors.

In one aspect, there is provided a biosensing system including a FET-type device where the channel is made of a graphene oxide gel which is co-doped with boron nitrogen (BN-GO gel), and to which bioreceptors are added. The BN-GO gel can contain an abundance of COOH functional groups. Amine-terminated bioreceptors can functionalize themselves to the gel via carboxyl and amine reaction, and a passivation agent can be added. The system can interrogate the electrical changes of the FET-type device and make a determination as to the nature of a sample placed in contact with the bioreceptors. In some embodiments, the BN-GO gel consists of a 3D gel structure having bridges between B and N co-doped graphene oxide nanoflakes. In some embodiments, the BN-GO gel has bridges that include of C—O—C bonds. In some embodiments, the bioreceptor is selected from the group consisting of a nucleic acids, protein, enzyme, cell, or biomimetic. In some embodiments, the bioreceptor is a protein, the protein being one of an enzyme, a substrate, an antigen, an antibody, a ligand, an aptamer and a receptor. In some embodiments, the protein comprises an antibody. In some embodiments, the carboxyl and amine reaction results in the bioreceptor attached to the BN-GO gel by covalent bonding. In some embodiments, the passivation agent is one of ethanolamine, oxide layer, dielectric layer, or 2D insulator.

In one aspect, there is provided a process of fabricating the BN-GO gel of the present disclosure by a laser ablation process with a pulse duration between 5 and 25 femtosecond, preferably in the 10 femtosecond range. The shorter laser duration can increase the C—C bonds in the gel and lower scattering defects, which in turn, can translate to high carrier mobilities and ON and OFF current ratio. In some embodiments, the BN-GO gel fabricated has a carrier mobility between 10$^6$ cm$^2$V$^{-1}$ s$^{-1}$ and 10$^3$ cm$^2$V$^{-1}$ s$^{-1}$, preferably between 10$^6$ cm$^2$V$^{-11}$ s$^{-1}$ and 10$^4$ cm$^2$V$^{-1}$ s$^{-1}$], and ON and OFF current ratio between 10$^8$ and 10$^5$ cm$^2$ V$^{-1}$ s$^{-1}$, preferably between 10$^8$ cm$^2$V$^{-1}$ s$^{-1}$ and 10$^6$ cm$^2$V$^{-1}$ s$^{-1}$. The high mobility and ON and OFF current ratio can be particularly useful in FET-type biosensors as they may increase the detection range and enhance the limit of detection towards numerous bio-analytes compared to the prior art.

In one aspect there is provided a method of detecting a target bio-analyte in a sample, the method comprising: (a) contacting the BN-GO gel of the FET-based sensor of the present disclosure with a sample; (b) monitoring a change in an electrical characteristic; and (c) detecting a target bio-analyte contingent upon the change in electrical characteristic corresponding to a predetermined signature. In some embodiments, the change in an electrical characteristic as a function of time indicates the presence of the target bio-analyte. In some embodiments, the change in the Dirac voltage indicates the presence of the target bio-analyte. In some embodiments, the electrical characteristic is selected from the group consisting of conductance, capacitance, potential, resistance, and inductance. In some embodiments, the sample is a gas sample, a liquid sample, or a suspension. In some embodiments, the liquid is a phosphate buffer saline (PBS), water, DI water, pH=7 buffer solution, other electrolytes, or any diluted version of such solutions. In some embodiments, the method detects a target bio-analyte selected from the group consisting of environmental bio-analytes. In some embodiments, the environmental bio-analytes may include organic pollutants, toxins (e.g. aflatoxin), pesticides, or pathogens (bacteria, protozoa, fungi, or virus). In some embodiments, the method detects a target bio-analyte selected from the group consisting of agriculture bio-analytes. In some embodiments, the agriculture bio-analytes may include organic pollutants, toxins (e.g. aflatoxin), pesticides, or pathogens (bacteria, protozoa, fungi, or virus). In some embodiments, the method detects a target bio-analyte selected from the group consisting of human source bio-analytes. In some embodiments, the human source bio-analytes may include proteins, nucleic acids, antigens, hormones, bacteria, protozoa, fungi, viruses, cells, enzymes, genes, or oxidative stress. In some embodiments, the method detects a target bio-analyte selected from the group consisting of animal source bio-analytes. In some embodiments, the animal source bio-analytes may include proteins, nucleic acids, antigens, bacteria, fungi, viruses, cells, enzymes, genes, or oxidative stress. In some embodiments, the method detects a target bio-analyte selected from the group consisting of food source bio-analytes. In some embodiments, the food source bio-analytes may include pesticides, toxins (e.g. aflatoxin), antibiotics, hormones, bacteria, or other pathogens.

Many further features and combinations thereof concerning the present improvements will appear to those skilled in the art following a reading of the instant disclosure.

DESCRIPTION OF THE FIGURES

In the figures,

FIG. 1 is a photograph of a monolayer graphene oxide (GO) nanoflakes solution in DI water (5 mg/mL) on the left and a hexagonal boron nitride (h-BN) ultrafine powder solution in 50:50 DI water:ethanol (1.24 mg/mL) on the right.

FIG. 2 is a schematic representation of the laser-ablation setup used throughout the present disclosure.

FIG. 3A is a graph of the intensity in function of the binding energy for the composition of the C 1s X-ray photoelectron spectroscopy (XPS) peaks of the BN-GO gel. 'Envelope' refers to the fitted convoluted peak components. The good fit between the envelope and the experimental data determines the degree of confidence of the XPS peak analysis.

FIG. 3B is a graph of the intensity in function of the binding energy for the composition of the N 1 s XPS peaks of the BN-GO gel. 'Envelope' refers to the fitted convoluted peak components. The good fit between the envelope and the experimental data determines the degree of confidence of the XPS peak analysis.

FIG. 3C is a graph of the intensity in function of the binding energy for the composition of the B 1 s XPS peaks of the BN-GO gel. 'Envelope' refers to the fitted convoluted peak components. The good fit between the envelope and the experimental data determines the degree of confidence of the XPS peak analysis.

FIG. 6A is an atomic force microscope (AFM) image of the precursor GO nanoflakes. (left) and BN-GO gel (right).

FIG. 6B is an AFM image of the BN-GO gel.

FIG. 6C is a graph showing the section analysis of the GO nanoflakes revealed the monolayer-to-bilayer nature of the precursor solution.

FIG. 16A is a schematic of a pre-patterned source and drain electrodes on a back-gated Si₂O/Si substrate during the fabrication of a BN-GO gel FET biosensor.

FIG. 16B is a schematic representation of the BN-GO gel deposition between the source and drain electrodes after FIG. 16A.

FIG. 16C is a schematic representation of the bioreceptor deposition onto the BN-GO gel showing attachment via covalent bonds after FIG. 16B.

FIG. 16D is a schematic representation of the BN-GO gel FET biosensor passivated with a passivation agent after FIG. 16C.

FIG. 16E is a schematic representation of the reference state, where a buffer solution is deposited onto the channel.

FIG. 18A is a schematic representation of the BN-GO gel FET biosensor use for detection of bio-analytes in air in the reference state, where a buffer solution is deposited onto the bioreceptor-functionalized passivated BN-GO gel and the electrical measurement is taken as a reference.

FIG. 18B is a graph of the electrical measurement of FIG. 18A.

FIG. 18C is a schematic representation of air being sent through a filter which collects dispersed contaminants including the potentially present target bio-analyte.

FIG. 18D is a schematic representation of the filter being rinsed with the buffer solution to transfer the contaminants into the buffer solution.

FIG. 18E is a schematic representation of the BN-GO gel FET biosensor with a droplet of the buffer solution containing the contaminants transferred from the air filter is deposited onto the bioreceptor-functionalized passivated BN-GO gel. The change of the electrical measurement is indicative of the detection of the target bio-analyte by the device among the contaminants extracted from the air filter.

FIG. 18F is a graph of the electrical measurement of FIG. 18E.

FIG. 19A is a schematic of the BN-GO gel FET biosensor use for detection of bio-analytes for health applications in the reference state, where a buffer solution is deposited onto the bioreceptor-functionalized passivated BN-GO gel and the electrical measurement is taken as a reference.

FIG. 19B is a graph of the electrical measurement of FIG. 19A.

FIG. 19C is a schematic representation showing an example of a sample collection through a blood sample extraction and its dilution in buffer.

FIG. 19D is a schematic representation of the BN-GO gel FET biosensor with a droplet of the sample deposited onto the bioreceptor-functionalized passivated BN-GO gel. The change of the electrical measurement is indicative of the detection of the bio-analyte by the device.

FIG. 19E is a graph of the electrical measurement of FIG. 19D

DETAILED DESCRIPTION

Figures 4, 5A, 5B:
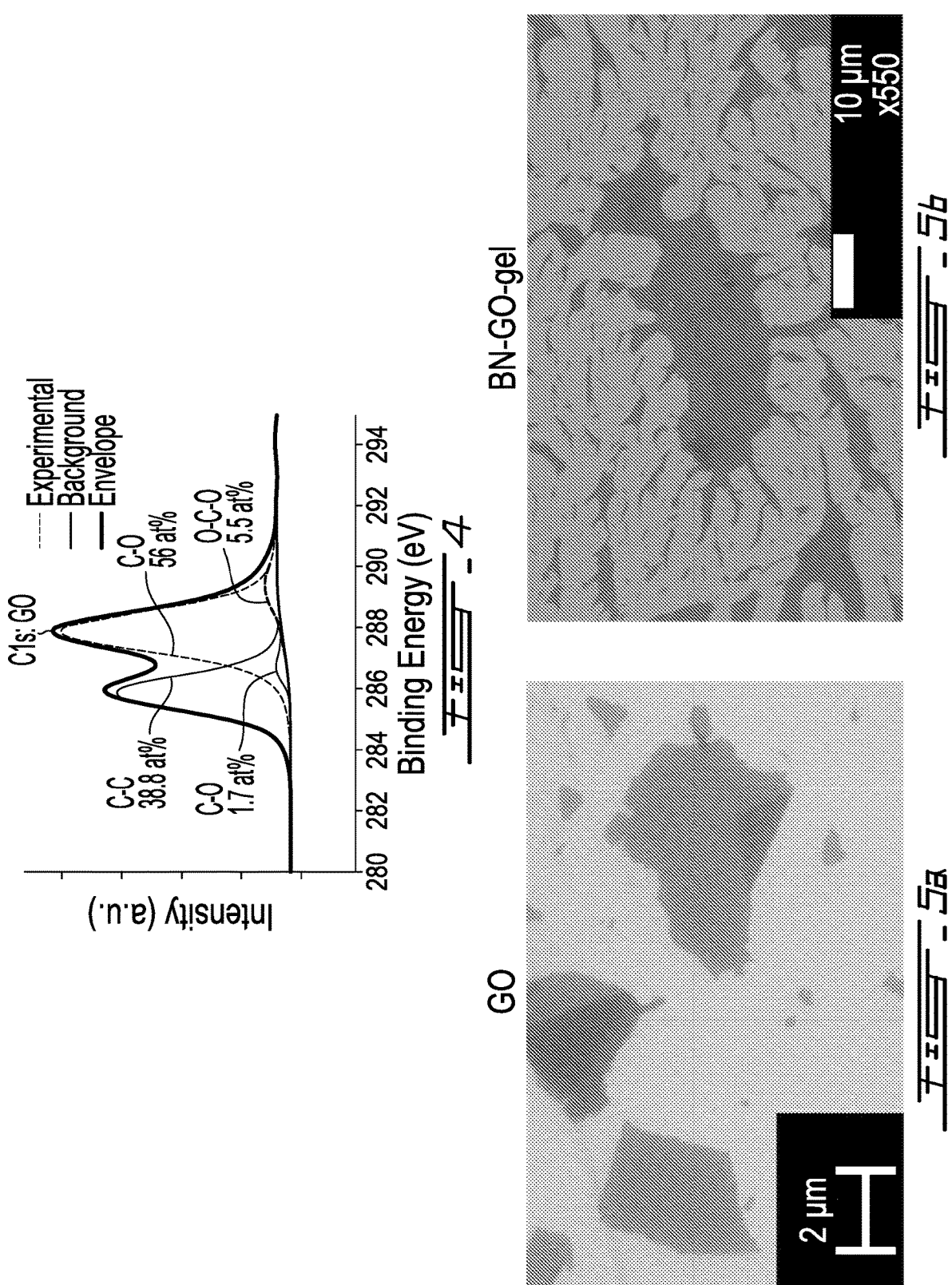
FIG. 4 is a graph of the intensity in function of the binding energy for the composition of the C 1s XPS peak of the precursor graphene oxide before the laser ablation process. 'Envelope' refers to the fitted convoluted peak components. The good fit between the envelope and the experimental data determines the degree of confidence of the XPS peak analysis.
FIG. 5A is a scanning electron microscopy (SEM) image of the precursor GO.
FIG. 5B is a scanning electron microscopy (SEM) image of the BN-GO gel.

A field-effect transistor (FET)-based biosensor and uses thereof will now be described in accordance with an embodiment, and in particular, an FET-based biosensor using a graphene oxide (GO) gel co-doped with boron and nitrogen (BN-GO gel) from hexagonal boron nitride (h-BN) precursor. Because the carrier mobility and the ON and OFF current ratio of the BN-GO gel can be higher than any reported for graphene-based FET biosensors, BN-GO gel FET-based biosensors may have improved sensing performance compared to other graphene-based FET biosensors. The disclosed BN-GO gel FET biosensor was shown to be excellent at detecting biomolecules thanks to the high charge carrier mobility and ON and OFF current ratio.

The fabrication process of the BN-GO gel can be performed as follows. A monolayer GO nanoflakes solution in DI water (e.g. from 0.5 to 10 mg/mL, from 1 to 10 mg/mL, from 2 to 8 mg/mL or 5 mg/mL of GO nanoflakes) is provided. The nanoflakes are suspended in the solution by ultrasonication (e.g. at least one hour in an ultrasonic bath). A h-BN ultrafine powder solution (e.g. from 0.05 to 2 mg/mL, from 0.1 to 2 mg/mL, from 0.5 to 2 mg/mL of h-BN) in 40:60 to 60:40 of DI water:ethanol is prepared and suspended by ultrasonication (e.g. at least one hour in an ultrasonic bath). In some embodiments, the disclosed method of BN-GO gel fabrication could be altered to add more DI water and/or more ethanol to control the viscosity of the fabricated gel.

The h-BN ultra fine powder solution is then irradiated, with a regenerative amplifier for example. In some embodiments, the irradiation conditions are one or more of the following: a pulse duration in the range of 1-50 fs, preferably 1-20 fs, more preferably 5-15 fs, even more preferably 8-12 fs, and most preferably 10 fs, a beam power in the range of 0.1-5 W, preferably 0.1-2 W, more preferably 1-2 W, an operating wavelength in the range of 300-1000 nm, a pulse repetition rate in the range of 0.1-10 kHz, and for a duration of irradiation in the range of 30-120 minutes. The method can also be modified to use a different pulsed light source and a different method of focusing the laser light into the solution. The above embodiments are expected to change the viscosity of the gel, the composition of the gel, the size of the gel network, the carrier mobilities, and the ON and OFF current ratio.

After irradiation, the h-BN solution is subjected to a centrifugation step. The centrifugation step can be characterized by a centrifugation time in the range of 1-30 min and a rotation speed in the range of 100-8000 RPM. Variation in the centrifugation parameters can change the composition of the gel, the B and N doping concentration and dopant sites, the carrier mobilities, and the ON and OFF current ratio. The supernatant or upper portion obtained from the centrifugation is extracted and is referred to herein as the BN solution.

The BN solution and the GO solution are mixed together and ultrasonicated, for example for at least one hour in an ultrasonic bath. In some embodiments, the BN solution and the GO solution are mixed in a volume ratio of BN:GO from 1:99 to 20:80, from 2:98 to 15:85, from 3:97 to 10:90, from 4:96 to 6:94, or 5:95. The BN GO mixture is then irradiated under the conditions as explained above with respect to the h-BN solution irradiation. The irradiation can for example be a laser ablation process as described in greater detail below in the Example section. The irradiation is applied until the BN GO solution gains the consistency of a gel (in other words an increased viscosity). In some embodiments, the irradiation is performed until a volume of the BN GO solution has decreased by at least 30%, at least 35%, at least 40% or at least 45%. A BN-GO gel is accordingly obtained.

In some embodiments, the disclosed method of BN-GO gel fabrication could use different volume percentages of the BN and GO solutions (1-99 vol %). The above embodiments are expected to change the composition of the gel, the B and N doping concentration and dopant sites, the carrier mobilities, and the ON and OFF current ratio.

In some embodiments, the disclosed method of laser beam focusing could use a different lens with a focal length (10-200 mm) and the focal waist could have a range of 0-20 mm below the air/solution interface. This variation is expected to change the viscosity of the gel, the composition of the gel, the size of the gel network, the B and N doping concentration and dopant sites, the carrier mobilities, and the ON and OFF current ratio.

In some embodiments, a focusing (e.g., parabolic) mirror could be used instead of the focusing lens.

In some embodiments, the disclosed method of BN-GO gel fabrication could use different precursor materials including different 2D monolayers, few-layers, and multi-layers structures. These variations are expected to change the composition of the gel, the structure of the gel, the carrier mobilities, and the ON and OFF current ratio.

The increase in C—C bond abundance directly relates to the electronic properties of the gel and contribute to high carrier mobility. The larger concentration of C—C bonds in the BN-GO gel is directly related to the laser pulse duration (preferably 10 fs) and generally increases with decreasing laser pulse duration. The various chemical bonds and concentrations thereof for the present BN-GO gels are described in greater detail in the Example below.

EXAMPLE

The fabrication process of the BN-GO gel was performed as follows. Monolayer GO nanoflakes solution in DI water (5 mg/mL) was prepared and the nanoflakes were suspended in the solution by spending at least one hour in an ultrasonic bath, as illustrated in FIG. 1. A 1.24 mg/mL h-BN ultrafine powder solution in 50:50 DI water:ethanol was prepared and suspended by spending at least one hour in an ultrasonic bath, as illustrated in FIG. 1.

A Ti:Sapphire regenerative amplifier, with an operating wavelength of 800 nm, pulse duration of 10 fs, and a repetition rate of 1 kHz was used in all laser ablation processes. The laser beam was focused by a lens with a 50 mm focal length to ablate the solutions. A magnetic stage and a magnetic stirrer were used to agitate the solution during the ablation process to maintain the homogeneity of the solution. A short pulse duration of 10 fs was used as opposed to longer pulse durations of 35 fs. The shorter pulse duration translates to an increased laser intensity, which in turn breaks more bonds in the precursor materials. The h-BN solution was irradiated for 55 min at room ambient temperature with a beam power of 2 W, while constantly being stirred with a magnetic stirrer. The laser beam was focused by a lens with a 50 mm focal length, and the beam waist was set at 2 mm bellow the air/solution interface, as schematically presented in FIG. 2. The irradiated solution was then centrifuged for 15 min at 3000 RPM, and only the upper portion was extracted (1±0.05 mg/mL). This solution was denoted as BN solution.

The BN solution and the GO solution were mixed at the following volume percentages: 5 vol % BN and 95 vol % GO and suspended for at least one hour in an ultrasonic bath. The solution was irradiated for 50 min in a similar setup as the h-BN solution, but at a 1 W time-averaged beam power (as presented in FIG. 2). During the laser ablation process, the viscosity of the solution increased, until it resembled the viscosity of a gel and the volume of the solution decreased by 45%. The fabricated solution was denoted as BN-GO gel.

X-ray photoelectron spectroscopy (XPS) analysis of the BN-GO gel (FIGS. 3A-3C) demonstrated the co-doping effect of the laser ablation process. In particular, boron doped the BN-GO gel through B—C sites, while nitrogen doped the gel through pyridinic sites. Some of the BN also connected to the gel through B—N—C bonds. The comparison between XPS spectra in FIG. 3A and FIG. 4 demonstrates the effect of the laser ablation process presented in this disclosure over the carbon and oxygen bonds and compositions. The BN-GO gel has higher atomic percentages of C—C bonds (43.6 at % versus 38.8 at %), which confirms the structural restoration of the graphene backbone, and O—C=O bonds (9.9 at % versus 3.5 at %). The increase in C—C bond abundance directly relates to the electronic properties of the gel and contribute to high carrier mobility. The larger concentration of C—C bonds in the BN-GO gel is directly related to the laser pulse duration (10 fs) and generally increases with decreasing laser pulse duration. Additionally, C—O—C bonds are present in high atomic percentages in the BN-GO gel (46.5 at %). The bonds identified in FIG. 4 were as follows: C—O 1.7 at %, C—C 38.8 at %, C=O 56 at %, and O—C=O 3.5 at %.

The advantage in using the 10 fs laser pulse duration in the fabrication process instead of using the 35 fs laser pulse duration stems from the compositional difference between the two otherwise same fabrication processes, as summarized in the table below:

TABLE 1

The compositional difference between BN-GO gel fabricated using a laser with 10 fs pulse duration versus 35 fs pulse duration.

| XPS peak | Bond | 35 fs fabrication (at %) | 10 fs fabrication (at %) |
|---|---|---|---|
| C 1s | C—C | 41.8 | 43.6 |
| | (C=O)—OH | 12.8 | 9.9 |
| | C—O—C | 45.4 | 46.5 |
| B 1s | B—N | 35.6 | 95.6 |
| | B—C$_3$ | 53.2 | 4.4 |
| | B—C$_2$O | 11.2 | 0 |
| N1s | Pyridinic N | 0 | 21.7 |

TABLE 1-continued

The compositional difference between BN-GO gel fabricated using a laser with 10 fs pulse duration versus 35 fs pulse duration.

| XPS peak | Bond | 35 fs fabrication (at %) | 10 fs fabrication (at %) |
|---|---|---|---|
| | C—N—B | 49.7 | 78.3 |
| | Pyrrolic N | 50.3 | 0 |

From Table 1, the difference between the two fabrication processes is apparent. First, there were 1.8 at % more C—C bonds and 1.1 at % more C—O—C bonds in the 10-fs laser ablation fabricated gel. These changes in the bond structures increased the carrier mobility and the size of the gel. Second, there were no Pyrrolic N dopants and B—O$_2$O B dopants in the 10-fs laser ablation fabricated gel. Both these dopants introduce structural defects corresponding to charge-scattering. Thus, the BN-GO gel presented in this disclosure has a better structural integrity, less scattering sites, and better electrical performance.

Figure 7:
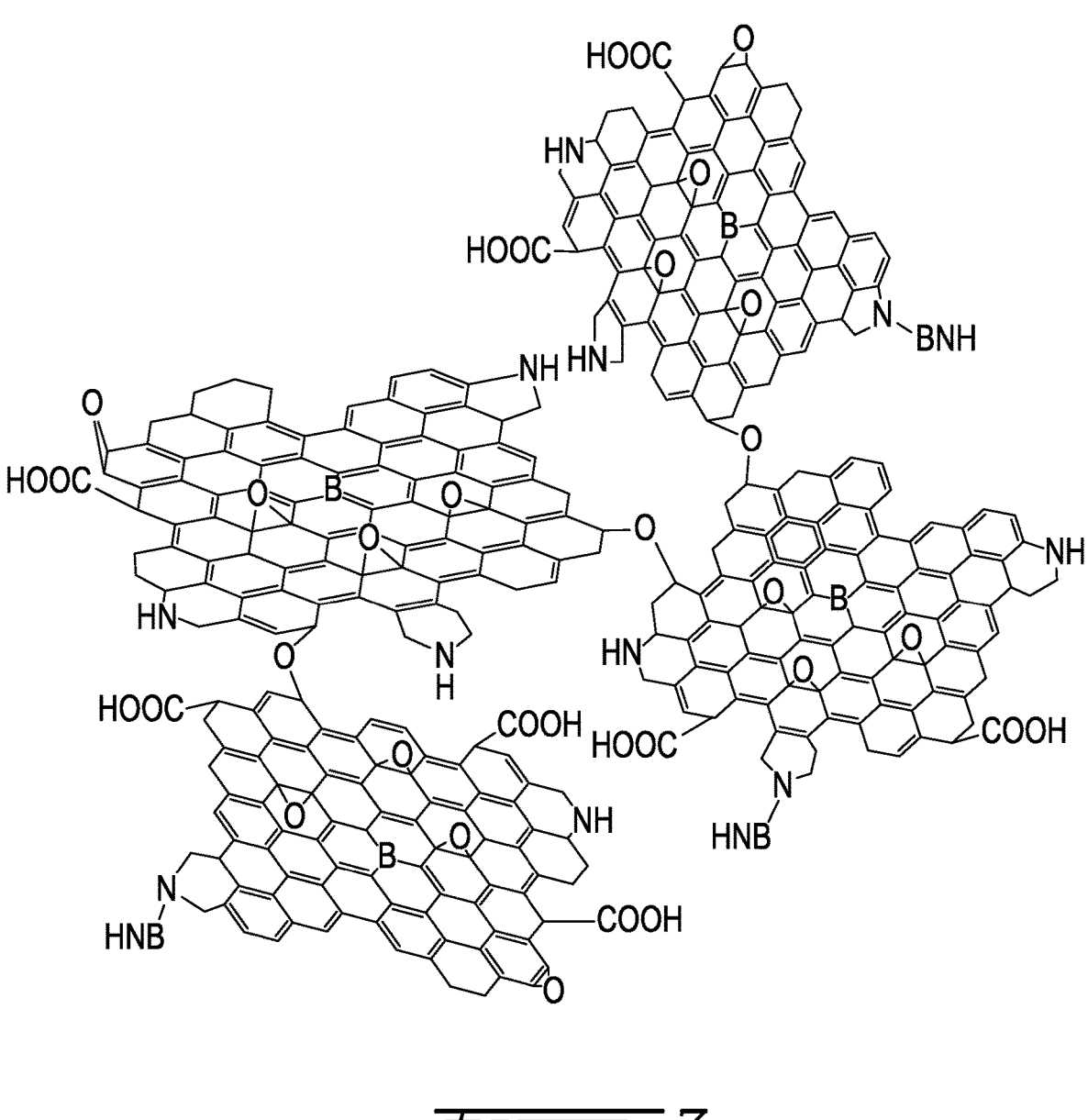
FIG. 7 is a schematic diagram of the chemical structure of the BN-GO gel.

The scanning electron microscopy (SEM) images of the precursor GO and the BN-GO gel (FIGS. 5A-5B) demonstrated the increase in the size of the monolayer from 2-3 μm to larger than 30 μm. The increased size of the gel was due to C—O—C bonds between the different nanoflakes. These bonds were confirmed by X-ray photoelectron spectroscopy with sample data presented in FIGS. 3A-3C (46.5 at %). Additionally, the SEM images show the non-flat structure of the BN-GO gel. FIGS. 6A-6C presents the change in the structure from flat nanoflakes in the GO precursor to a larger 3D structure in the BN-GO gel as observed in an atomic force microscope (AFM) image. Based on FIGS. 4, 5A-5B, and 6A-6C, the chemical structure of the produced BN-GO gel is presented in FIG. 7.

It was observed that the concentration of C—C bonds in C 1s peak ranged from 40 to 44 at %. The higher the concentration of C—C bonds in C 1s peal the larger the ON and OFF current ratio obtained becomes. In some embodiments, the C—C bond C 1s peak is at least 40 at %, at least 41 at %, at least 42 at % or at least 43 at %. In some embodiments, the C—C bonds in C 1s peak range from 40 to 46 at %, from 40 to 45 at %, from 40 to 44 at %, from 41 to 46 at %, from 41 to 45 at %, from 41 to 44 at %, from 42 to 46 at %, from 42 to 45 at %, from 42 to 44 at %, from 43 to 46 at %, from 43 to 45 at %, or from 43 to 44 at %.

The lower the ratio of C—O—C and C—C concentrations in the C 1s peak the higher the ON and OFF current ratio. The ratio between C—O—C and C—C concentrations in the C 1s peak ranged from 1.05 to 1.18. In some embodiments, the ratio between C—O—C and C—C concentrations in the C 1s peak is less than 1.17, less than 1.16, less than 1.15, less than 1.14 and preferably less than 1.13 with optionally a lower limit of 1.05.

It was observed that the ratio between oxygen functional groups (C—O—C and O—C=O) and C—C concentrations in the C1s peak ranges between 1.28 and 1.4. The lower the ratio between oxygen functional groups (C—O—C and O—C=O) and C—C concentrations in the C1s peak, the higher the ON and OFF current ratio. In some embodiments, the ratio between oxygen functional groups (C—O—C and O—C=O) and C—C concentrations in the C1s peak is between 1.28 and 1.39, or between 1.28 and 1.38 or less than 1.38.

In some embodiments, the concentration of B—C bonds in B 1 s peak ranges between 0-100 at %. The higher the concentration of B—C bonds in B 1 s peak, the larger the electron mobility. In preferred embodiments, to obtain an electron mobility above 1000 cm²/Vs the concentration of B—C bonds in B 1 s peak must be above 4 at %, for example 4-100 at %. The higher the concentration of B—$O_2$O bonds in B 1 s peak, the lower the ON and OFF current ratio. In preferred embodiments, the B—$O_2$O concentration is less than 6 at %.

It was observed that the C 1s concentration in the spectra ranged between 66-72 at %. The higher the C 1s concentration in the spectra the larger the ON and OFF current ratio. In some embodiments, the C 1s concentration in the spectra is at least 67 at %, at least 68 at %, preferably at least 69 at %, or from 67 to 72 at %, from 68 to 72 at % or from 69 to 72 at %.

It was observed that the O 1s concentration in the spectra ranged between 28-32 at %. The higher the O 1s concentration in the spectra the lower the ON and OFF current ratio. In some embodiments, the 01 s concentration in the spectra is less than 31 at %, less than 30 at %, or preferably less than 29.5 at %. In some embodiments, the O1s concentration in the spectra is from 28 to 31 at %, from 28 to 30 at %, or preferably from 28 to 29.5 at %.

The higher the B 1s concentration in the spectra the lower the ON and OFF current ratio. In some embodiments, the B 1s concentration in the spectra is less than 1 at %. In some embodiments, the combined N 1s+B 1s concentration in the spectra ranges between 0.2 and 2.4 at %. The higher the N 1s+B 1s concentration in the spectra the lower the electron mobility. In preferred embodiments, to improve an increased electron mobility the N 1s+B 1s concentration in the spectra is less than 2 at %, less than 1.5 at %, less than 1 at %, and more preferably less than 0.9 at %. In some embodiments, the N 1s+B 1s concentration in the spectra is from 0.2-2 at %, 0.2-1.5 at %, or 0.2-0.9 at %. The higher the N 1s+B 1s concentration in the spectra the lower the hole mobility. To achieve an improved hole mobility the N 1s+B 1s concentration in the spectra should be less than 2 at %, less than 1.5 at % or less than 1 at % for example from 0.2-0.95 at %. Pyrrolic N concentration above 0 at % (e.g. 0.01 or more, 0.1 or more or 0.5 or more) in the N 1s peak decreases the electron and hole mobilities.

Figure 8:
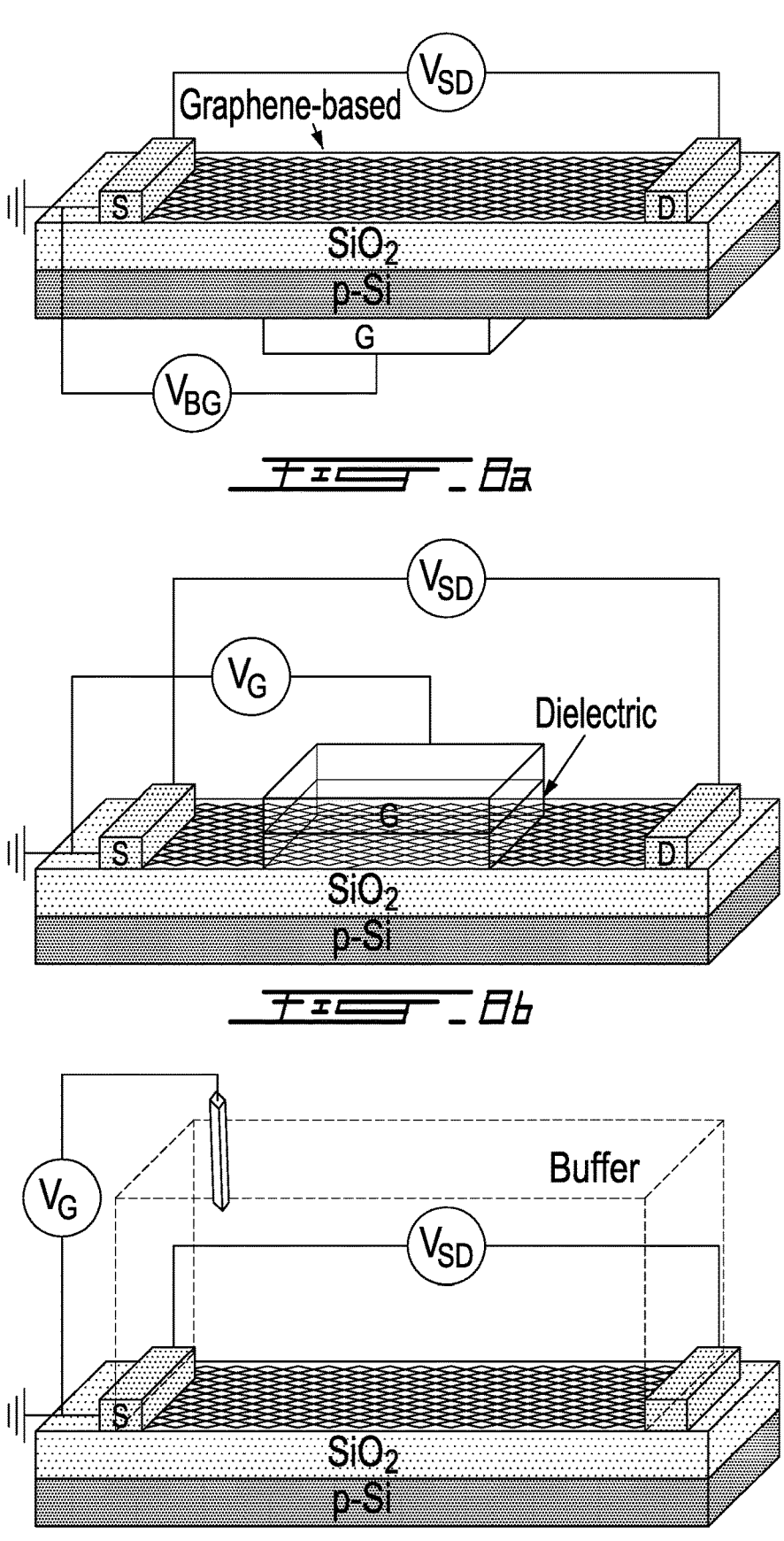
FIG. 8A is a schematic of a graphene-based field effect transistor device configuration having a back-gated FET electrical contact.
FIG. 8B is a schematic of a graphene-based field effect transistor device configuration having a top-gated FET electrical contact.
FIG. 8C is a schematic of a graphene-based field effect transistor device configuration having solution-gated or liquid-gated FET electrical contact.

In some embodiments, the BN-GO gel FET device could have different structures. The BN-GO gel could be deposited onto the source (S) and drain (D) electrodes (giving a bottom electrode structure) or below the source and drain electrodes (giving top electrode structure). The substrate could be $SiO_2$/Si or any other combination of insulator, insulator on metal, or insulator on semiconductor. The gate electrode could either be from the bottom contact (through the body or substrate), from the top, or through a conducting liquid medium as demonstrated in FIGS. 8A-8C. Voltage to the source and drain electrodes controls the direction of current in the BN-GO gel channel, while voltage to the gate electrode controls the conductivity of the BN-GO gel channel.

Figure 9:
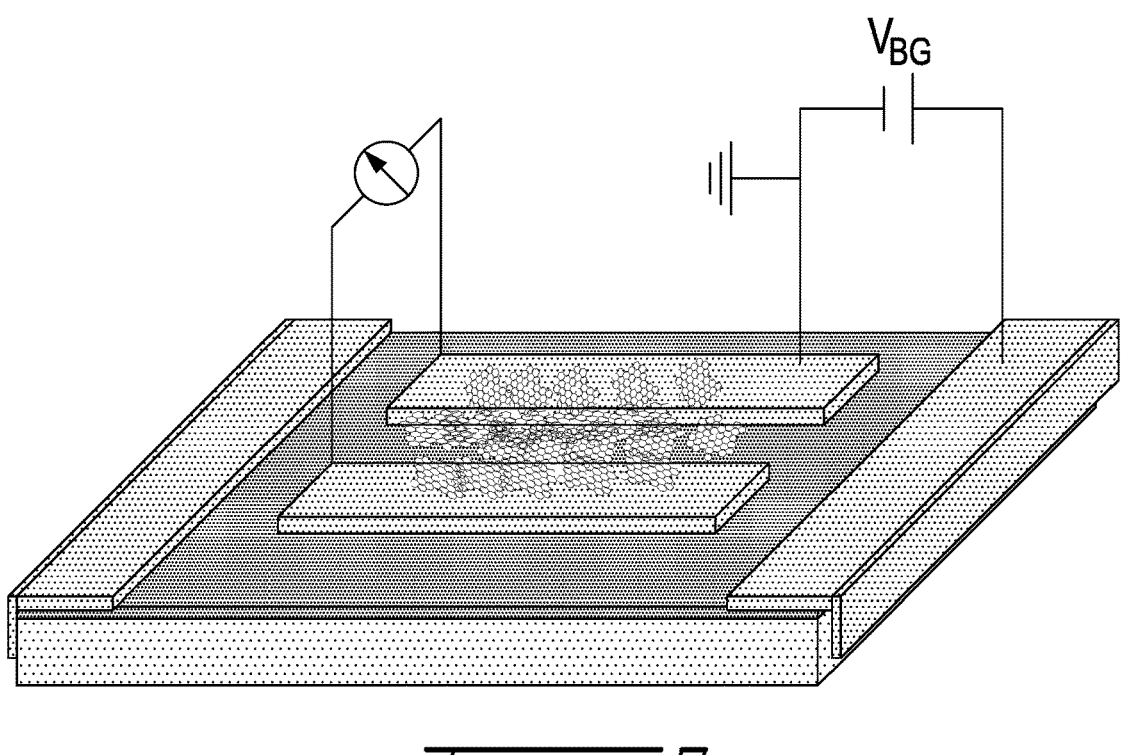
FIG. 9 is a schematic representation of a BN-GO gel FET device according to an embodiment.
Figure 10:
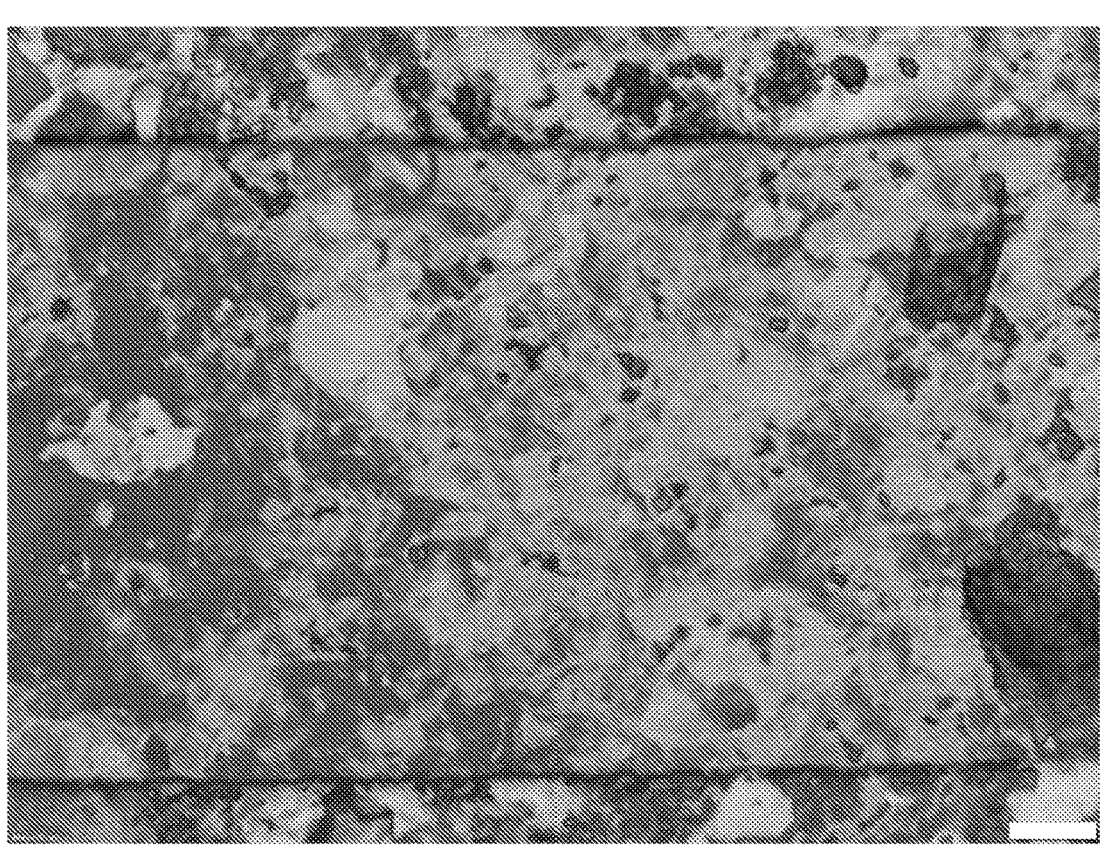
FIG. 10 is an optical microscope image of the BN-GO gel deposited onto a SiO₂/Si wafer containing pre-patterned source and drain electrodes.

An example of the BN-GO gel device used in this disclosure is presented in FIG. 9. The BN-GO gel channel (FIG. 10) was deposited onto a pre-patterned $SiO_2$/Si substrate with source, drain, and back-gate electrodes. Au (50 nm)/Ti (30 nm) electrodes were deposited on the substrates through a shadow mask using Intivac Nanochrome II-UHV system. Post deposition, the substrates were cleaned in an ultrasonic bath in Acetone and isopropyl alcohol (IPA), followed by $N_2$ drying. The gel was spin-coated onto the substrate between the source and drain electrodes, followed by a 2 min heat treatment at 95° C.

In some embodiments, the BN-GO gel channel length and width may vary between 1 nm-10 mm, while the channel thickness may vary between 1-1000 nm.

Figure 11B:
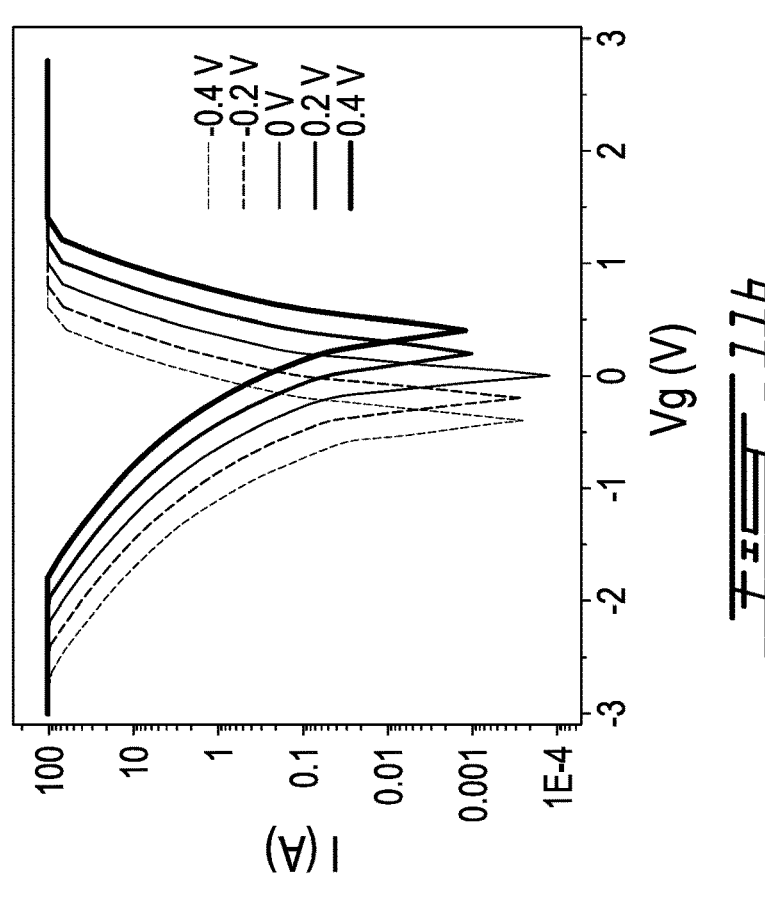
FIG. 11B is a graph showing the drain current vs gate voltage for different drain voltages of the BN-GO gel FET fabricated using the disclosed laser ablation process with a pulse duration of 35 fs.
Figure 11A:
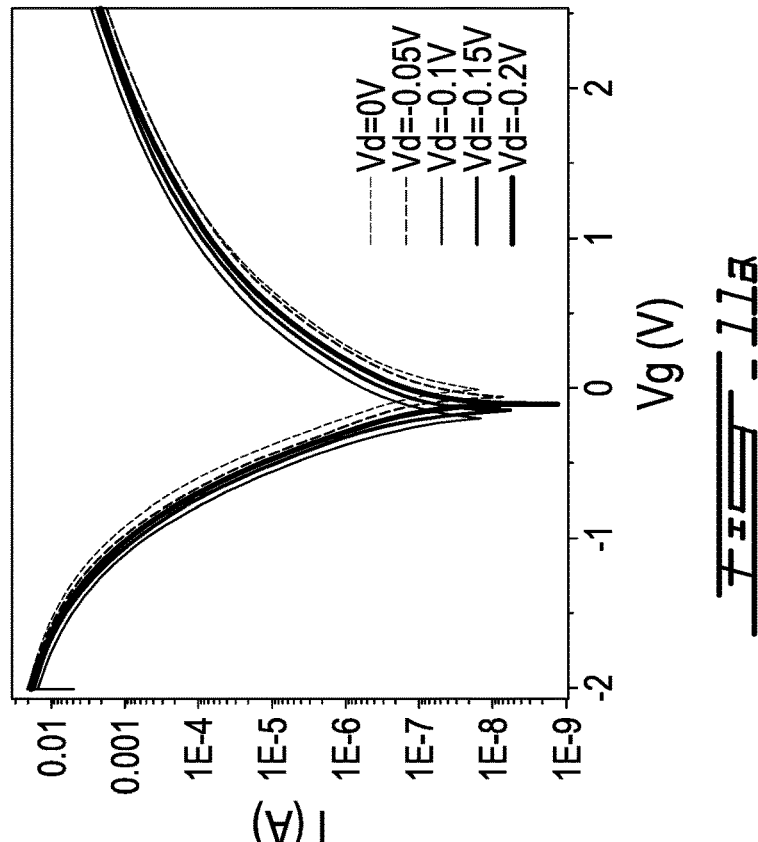
FIG. 11A is a graph showing the drain current vs gate voltage for different drain voltages of the BN-GO gel FET fabricated using the disclosed laser ablation process with a pulse duration of 10 fs.

The absolute drain current (ID) vs back-gate voltage (VBG) of the BN-GO gel was measured for a constant drain voltage (VD), as presented in FIGS. 11A-11B. The channel length and width of the device were 70 μm and 2 mm, respectively, while the thickness was −50 nm. FIG. 11A presents the electrical performance of the BN-GO gel discussed in this disclosure (fabricated using a laser pulse duration of 10 fs), while FIG. 11B presents the electrical properties of a BN-GO gel fabricated in the same process but at a longer pulse duration (35 fs).

The carrier mobility and ON and OFF current ratio of the BN-GO gel in FIG. 11A were extracted for a drain voltage of −50 mV. The values were 700,000 $cm^2V^{-1} s^{-1}$ and 30,000 $cm^2V^{-1} s^{-1}$ for hole and electron mobilities, while the ON and OFF current ratio was 106. The same configuration of device was repeated four additional times, and the average mobility values were calculated as 440,000±200,000 $cm^2V^{-1} s^{-1}$ and 8,700 $cm^2V^{-1} s^{-1}$ for holes and electrons, respectively. The ON and OFF current ratio was in the range of $10^6$-$10^7$. In contrast, the BN-GO gel fabricated using a pulse duration of 35 fs gives an average electron and hole mobilities of 8700±3000 $cm^2V^{-1} s^{-1}$ and 5000±2500 $cm^2V^{-1} s^{-1}$, respectively, and an ON and OFF current ratio in the range of $10^5$-$10^6$. Therefore, the superiority of the shorter laser pulse duration (10 fs versus 35 fs) for the fabrication of BN-GO gel for electronics is clearly demonstrated.

Figures 12A, 12B, 12C:
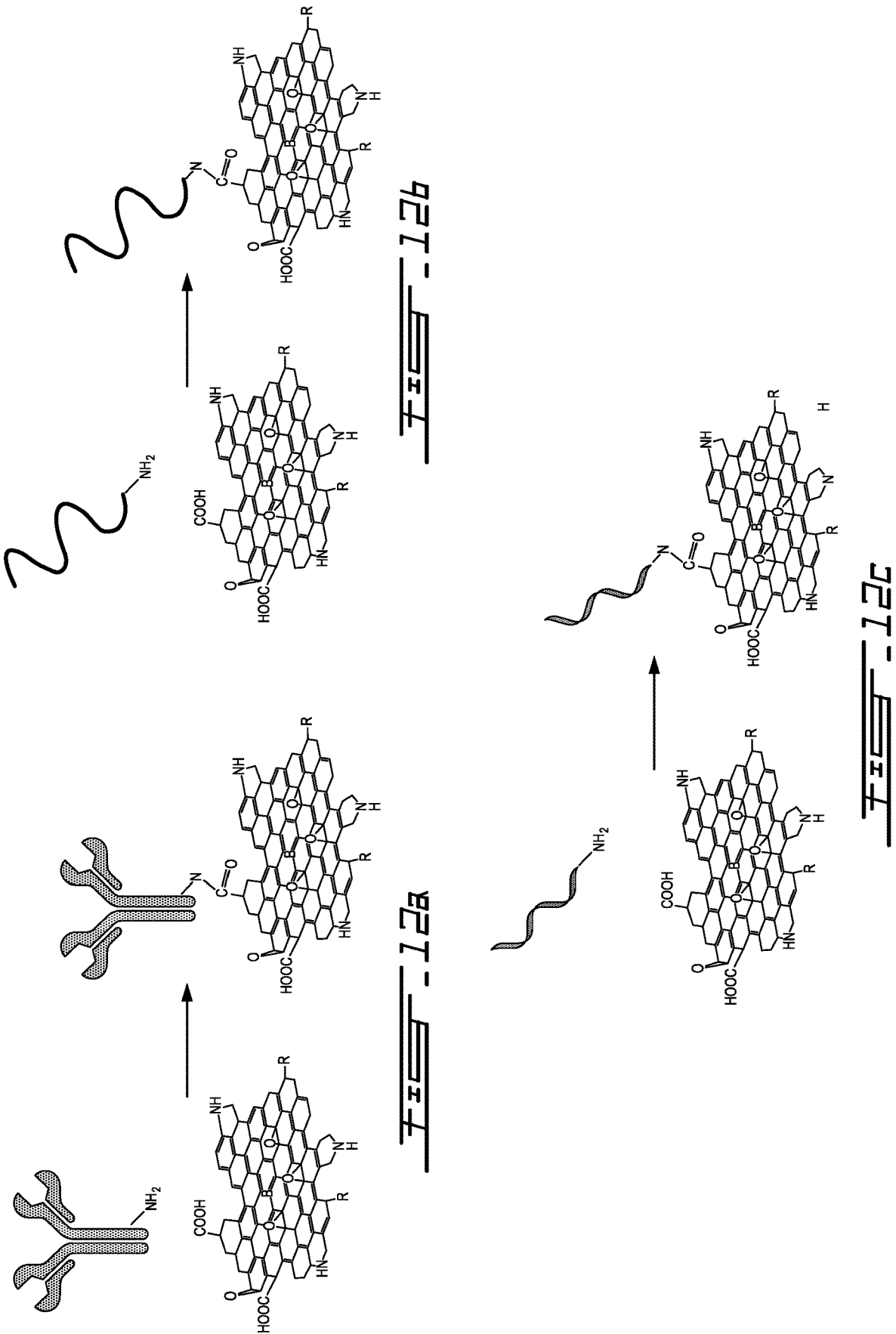
FIG. 12A is a schematic of the functionalization of the BN-GO gel channel of the FET biosensor with antibodies.
FIG. 12B is a schematic of the functionalization of the BN-GO gel channel of the FET biosensor with aptamers.
FIG. 12C is a schematic of the functionalization of the BN-GO gel channel of the FET biosensor with an oligo-nucleotide.

The BN-GO gel FET devices are a biosensing platform, where the type of bioreceptor determines the biosensor application. Since COOH bonds are abundant in the BN-GO gel, they can be used to functionalize any amine-terminated bioreceptor onto the channel, as demonstrated in FIGS. 12A-C. In this disclosure, the antibodies (B-type natriuretic peptide (BNP) antibodies, 50E1) were diluted in pH=7 buffer to a 1 nM solution. 5 μL droplets were dropped onto the BN-GO gel channels and left at 4° C. for 48 h. The antibodies attached to the carboxyl groups in the channels. Since this functionalization process was shown successful on antibody attachment (FIG. 12A), the same process may be used for any amine-terminated bioreceptor, such as any type of antibody, amine-terminated aptamers (FIG. 12B), or amine-terminated oligonucleotide (FIG. 12C).

In some embodiments, the buffer solution may include phosphate buffer saline (PBS), water, DI water, pH=7 buffer solution, other electrolytes, or any diluted version of such solutions.

In some embodiments, the incubation time may range between 1-48 hr, and the temperature may range between 2-25° C.

In some embodiments, some sort of shaking or stirring may be introduced.

Figure 13:
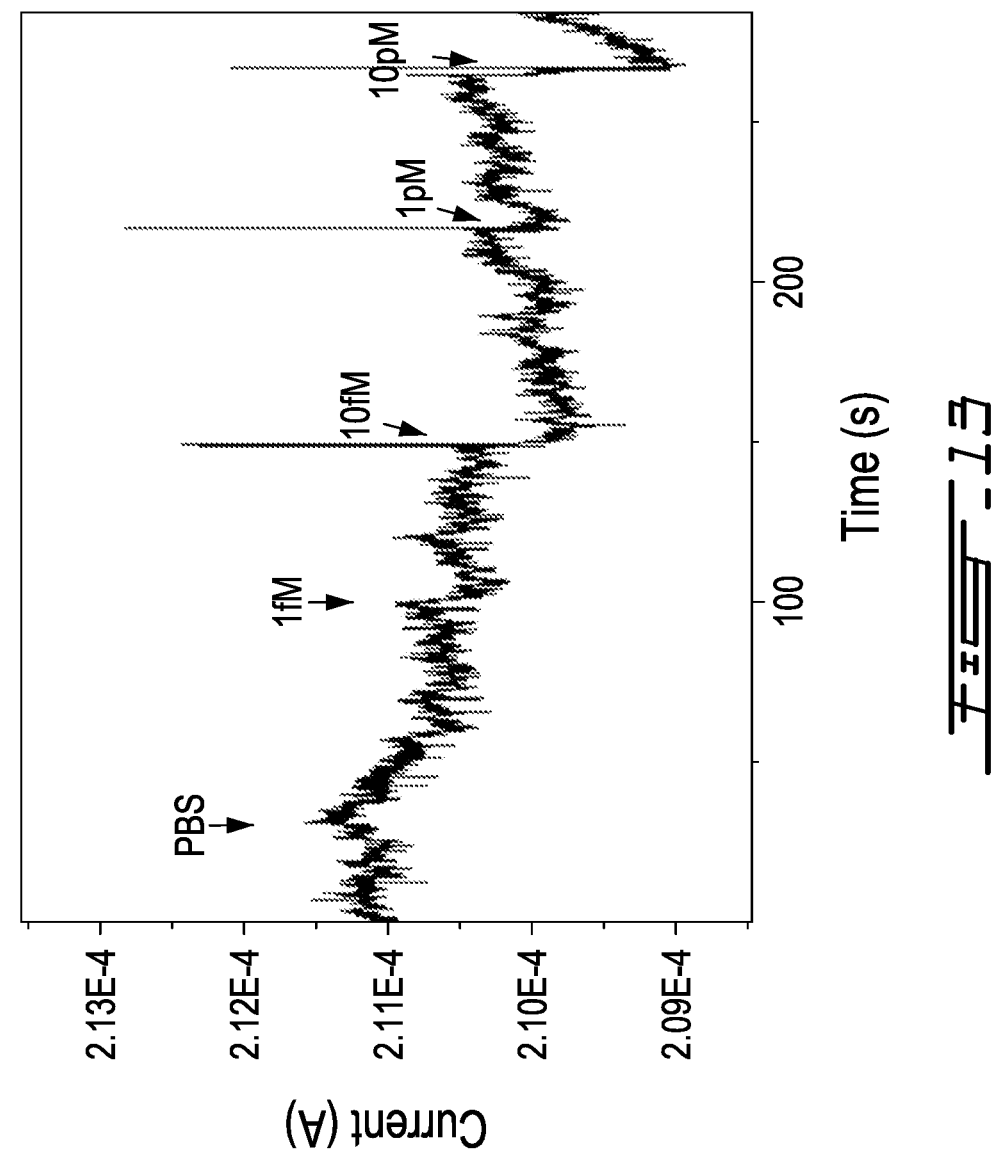
FIG. 13 is a graph showing the current monitoring over time for constant biases of the bioreceptor-functionalized BN-GO gel biosensor when increasing concentrations of bio analyte are being introduced. The change in current indicates the biosensing response.

BNP was serially diluted to multiple concentrations in buffer solution (to concentrations of 10 aM-1 μM). A 2.5 μL BNP solution with increasing concentrations was dropped onto the BN-GO gel channel every 50 seconds, while continuously monitoring the device's current (for constant drain and back-gate voltages of −0.05 V and −0.6 V, respectively). The change in current versus time was indicative of BNP attachment to the antibodies, and thus, for the successful biosensing signal, as demonstrated in FIG. 13.

In this disclosure, the BN-GO gel FET biosensor functionalized with a protein (15 kDa) was able to detect protein (3.5 kDa) with a limit of detection of 10 aM and a detection range of 10 aM-1 μM. A similar device configuration using a larger bioreceptor protein (50 kDa) was used to detect protein (115 kDa) with a limit of detection of 10 ag/mL and a detection range of 10 ag/mL-1 µg/mL. Based on these results, it is expected that the BN-GO gel functionalized with smaller bioreceptors (<15 kDa) would be able to detect any bio-analyte corresponding to the bioreceptor at a better limit of detection and range of detection. Additionally, it is expected that the BN-GO gel functionalized with larger bioreceptors (>50 kDa) would be able to detect bio-analytes corresponding to the bioreceptor but at a slightly lower limit of detection and range of detection.

In some embodiments, the drain and gate voltages may range between −4-4 V, and the sampling interval may range between 10-600 seconds. The sample volume may range between 1 µL-1 mL.

Figure 14:
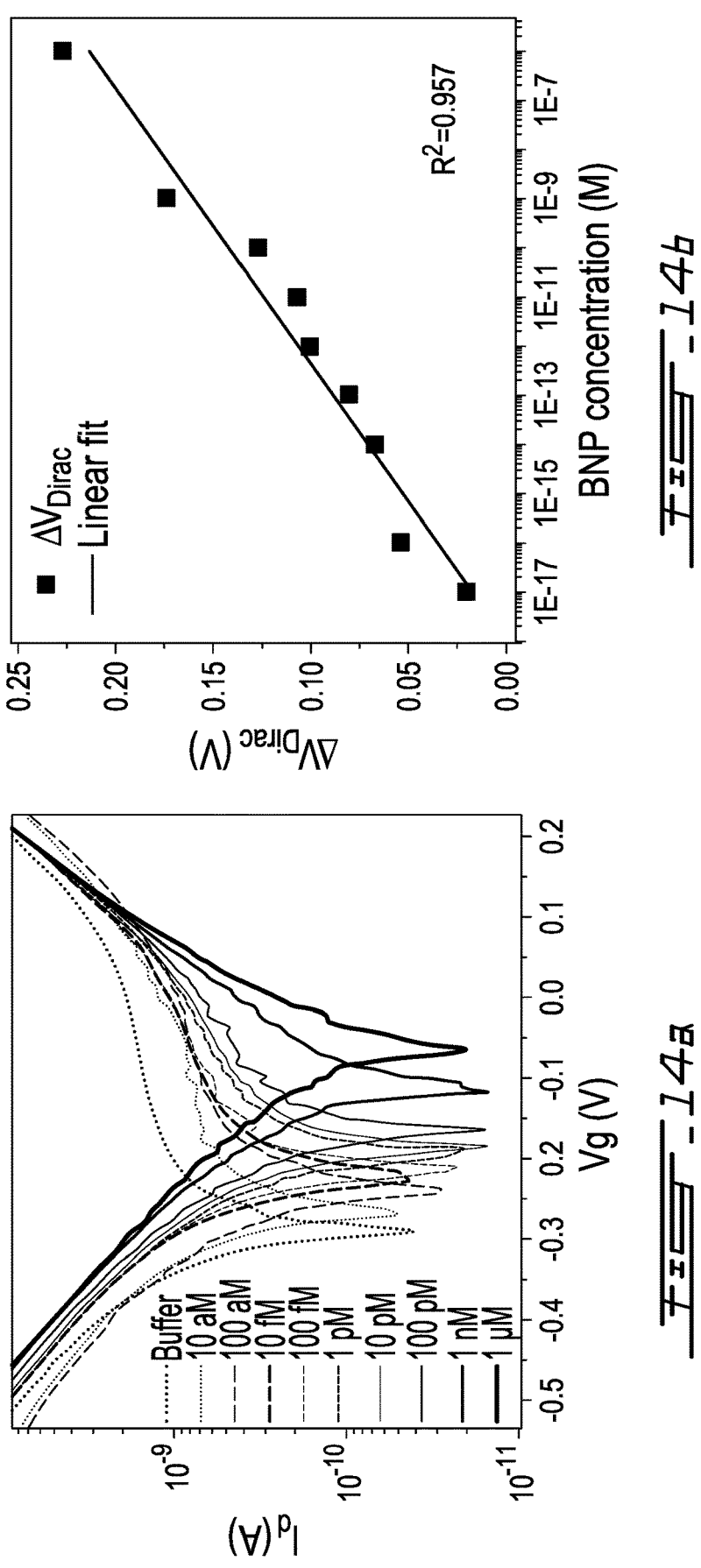
FIG. 14A is a graph showing the monitoring of the shift of the gate voltage corresponding to the minimal drain current (Dirac voltage shift) in response to the addition of bio-analyte.
FIG. 14B is a graph showing the correlation of the Dirac shift of FIG. 14A and the concentration of the target analyte.

Similarly, 2.5 µL of BNP solution with increasing concentrations was dropped onto the BN-GO gel channel, and an absolute drain current vs gate voltage plot was obtained after 2 min (at a constant drain voltage of −0.05 V). Then the channel was rinsed with buffer solution and the measurement was repeated with a higher concentration of BNP. The results for buffer solution were taken as the reference. The shift in the voltage corresponding to the minimal current point (Dirac voltage) is the biosensing response, as demonstrated in FIGS. 14A-14B. A larger shift corresponds to a higher concentration of the bio-analyte.

The device fabrication process is demonstrated in FIGS. 16A-16E, where the BN-GO gel is deposited between the source and drain pre-patterned electrodes on a back-gated SiO₂/Si substrate (FIGS. 16A-B). The BN-GO gel channel was functionalized with the amine-terminated bioreceptor via carboxyl-amine reaction (FIG. 16C) and the device was passivated by a passivation agent (FIG. 16D). A buffer solution was deposited on the channel and the electrical measurement of the device (either current vs time, or current vs gate voltage) was taken as the reference (FIG. 16E).

Figure 17B:
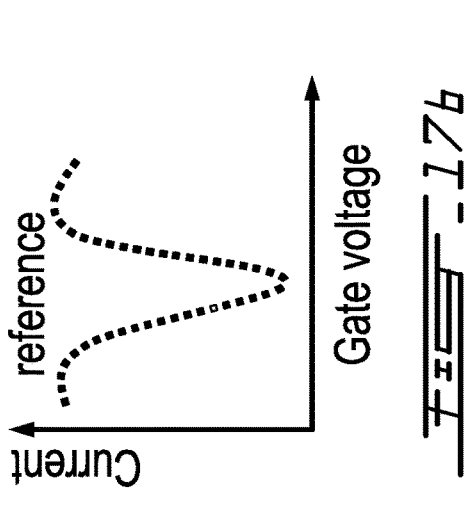
FIG. 17B is a graph of the electrical measurement of FIG. 17A.
Figure 17E:
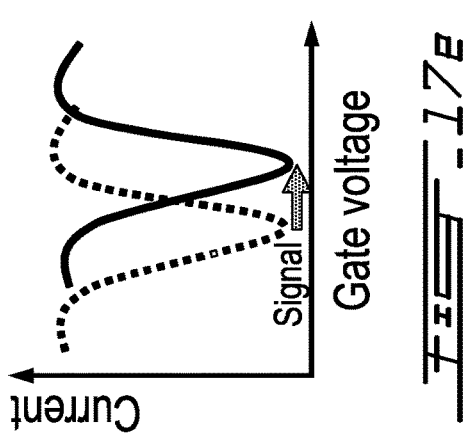
FIG. 17E is a graph of the electrical measurement of FIG. 17D.
Figure 17A:
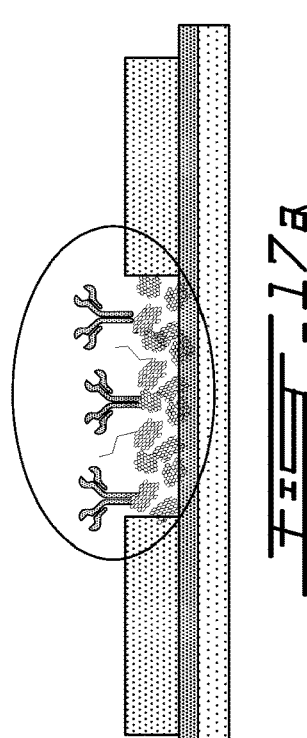
FIG. 17A is a schematic of the BN-GO gel FET biosensor use for detection of bio-analytes present in a water sample during the reference state, where a buffer solution is deposited onto the bioreceptor-functionalized passivated BN-GO gel and the electrical measurement is taken as a reference.
Figure 17D:
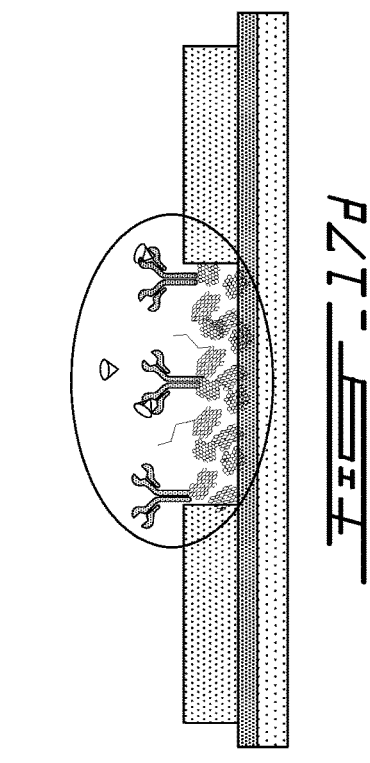
FIG. 17D is a schematic representation of the BN-GO gel FET biosensor with a droplet of the mixture of FIG. 17C deposited onto the bioreceptor-functionalized passivated BN-GO gel. The change of the electrical measurement is indicative of the detection of the bio-analyte by the device in the water sample.
Figure 17C:
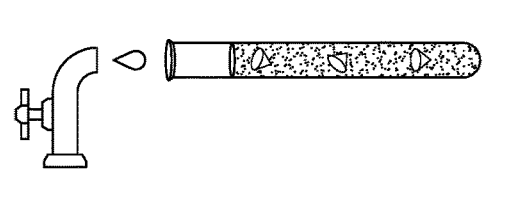
FIG. 17C is a schematic representation of the BN-GO gel FET biosensor receiving a water sample with potential presence of the bio-analyte is collected and mixed with the buffer solution.

One application for a water-testing BN-GO gel FET biosensor is illustrated in FIGS. 17A-17E. The device was fabricated in a similar process as discussed in FIGS. 16A-16E, but with a bioreceptor specific for a target bio-analyte present in a water sample (FIGS. 17A-17B). Some examples of the target bio-analytes included *Legionella, Clostridium botulinum, Vibrio cholerae*, genera *Shigella* and *Salmonella*, genus *Leptospira, Salmonella typhi, Absidia, Acremonium, Mucorcircinelloides*, and *Candida albicans*. The sample collection was either from a faucet or any other water source such as river, well, or wastewater. The sample was diluted with the same buffer used as a reference (FIG. 17C). A droplet from the diluted sample was dropped onto the BN-GO gel channel, and an electrical measurement was performed (FIGS. 17D-17E). A change in the electrical measurement from the reference measurement was indicative of a successful detection of the target bio-analyte.

One application for an air-testing BN-GO gel FET biosensor is illustrated in FIGS. 18A-18F. The device was fabricated in a similar process as discussed in FIGS. 16A-16E, but with a bioreceptor specific for a target bio-analyte in an air sample (FIGS. 18A-18B). Some examples of the target bio-analytes include viruses, or air pollutants. The sample collection could be through an air filter (FIG. 18C). The sample was extracted by submerging or rinsing the filter in the same buffer used as a reference (FIG. 18D). A droplet from the diluted sample was dropped onto the BN-GO gel channel, and an electrical measurement was performed (FIGS. 18E-18F). A change in the electrical measurement from the reference measurement was indicative of a successful detection of the target bio-analyte. Alternatively, the sample may be collected by the use of cyclonic (vortex) separation, by passing the air through a water filter, or via other methods that would extract aerosol particles dispersed in gas.

One application for a BN-GO gel FET biosensor for health monitoring is demonstrated in FIGS. 19A-19E. The device was fabricated in a similar process as discussed in FIGS. 16A-16E, but with a bioreceptor specific for a target bio-analyte for health monitoring (FIGS. 19A-19B). Some examples of the target bio-analytes include viruses, antigens, or proteins indicative of a disease (heart failure, cancer, diabetes). The sample collection was a blood sample (FIG. 19C), but could also be urine, saliva, serum, fecal matter, semen, mucus, spinal tap fluid, sweat, or biopsy products. The sample was then diluted in the same buffer as in the reference sample. A droplet from the diluted sample was dropped onto the BN-GO gel channel, and an electrical measurement was performed (FIG. 19D-19E). A change in the electrical measurement from the reference measurement was indicative of a successful detection of the target bio-analyte.

In some embodiments, the channel may be rinsed between measurements or the measurement may consist of the tested liquid being made to flow through the detection region of the device instead of a single droplet placement.

In some embodiments, the time between the sample deposition and the measurement may vary in the range of 1-600 seconds.

In some embodiments, the drain voltage may range between −4-4 V.

In some embodiments, the biomolecular interaction may include a protein-protein interaction, a protein-oligonucleotide interaction, a protein-cell interaction, or a protein-based interaction. Examples of protein-protein interaction include antigen-antibody, receptor-ligand, enzyme-substrate, enzyme-coenzyme, enzyme-activator, and enzyme-inhibitor binding.

In some embodiments, the biomolecular interaction may include a protein-bacteria interaction, such as antibody-bacteria, or protein-virus interaction, such as antibody-virus.

In some embodiments, the target biomolecule may be diluted to concentrations in the range of 1 yM-1 nM or not diluted at all.

In some embodiments, the sample may be from an environmental or agricultural source (such as water, soil, precipitation, air with dispersed contaminants, plants, or crops), from human source (such as blood, urine, saliva, serum, fecal matter, semen, mucus, spinal tap fluid, sweat, or biopsy products), from animal source (such as blood, urine, fecal matter, saliva, mucus, semen, serum, sweat, or biopsy product), or from food (such as any food-related liquid, food sample, or water from washing).

In some embodiments, the environmental bio-analyte may include organic pollutants, toxins (e.g. aflatoxin), pesticides, or pathogens (bacteria, protozoa, fungi, or virus).

In some embodiments, the agriculture bio-analyte may include organic pollutants, toxins (e.g. aflatoxin), pesticides, or pathogens.

In some embodiments, the human source bio-analyte may include proteins, nucleic acids, antigens, bacteria, fungi, protozoa, viruses, cells, enzymes, genes, or oxidative stress.

In some embodiments, the animal source bio-analyte may include proteins, nucleic acids, antigens, bacteria, fungi, protozoa, viruses, cells, enzymes, genes, or oxidative stress indicative of disease.

In some embodiments, the food source bio-analyte may include pesticides, toxins (e.g. aflatoxin), antibiotics, bacteria, protozoa, or other pathogens.

Figure 15:
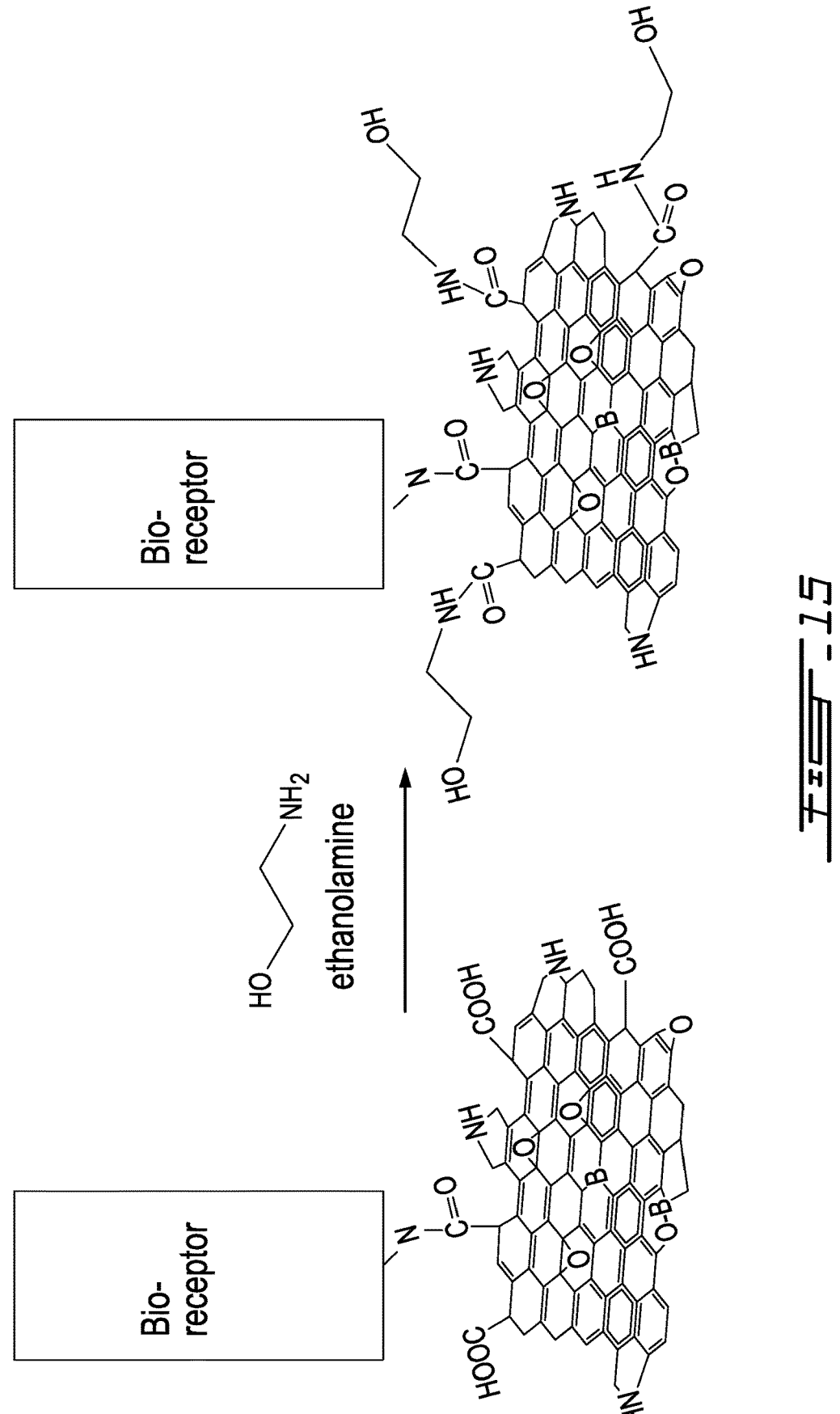
FIG. 15 is a schematic representation of a passivation of a bioreceptor-functionalized BN-GO gel using ethanolamine.

It may be beneficial to passivate the unbound COOH groups using a passivation agent such as ethanolamine, as demonstrated in FIG. 15. In this disclosure, the BN-GO gel channel was incubated for 2 hr in 3 μL of 10 mM ethanolamine solution at 4° C.

In some embodiments, a different passivation agent may be used, or different passivation times (1 hr-48 hr), different concentration of passivation agent (0.001-100 mM), different incubation temperatures (2-25° C.), or different volumes (0.001-1 mL).

In some embodiments, the BN-GO gel could be used for other device applications which require the use of high-mobility and/or high ON and OFF current ratios. Such applications may include any transistor applications, short-channel devices, wearable devices, and transparent electrode devices. The 2D structure of the precursor materials for the BN-GO gel are both flexible and transparent, thus, the BN-GO gel is expected to be highly desirable for such applications.

As can be understood, the examples described above and illustrated are intended to be exemplary only.

The scope is not limited in its application to the details of construction and the arrangement of components set forth in this description or illustrated in the drawings. Other embodiments can be practiced or carried out in various ways. Unless specified or limited otherwise, the terms "connected," and "functionalized" and variations thereof are used broadly and encompass both direct and indirect mountings, connections, Supports, and couplings. Further, "connected" and "functionalized" are not restricted to physical or mechanical connections. The use of "bioreceptors" "antibodies" "aptamers" or "probe DNA" and variations thereof herein is meant to encompass many types of antibodies, aptamers, bioreceptors, and probe-DNA and not solely those mentioned as well as additional items.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The scope is indicated by the appended claims.

What is claimed is:

1. A method of detecting a presence of an analyte adapted to a receptor in a sample, the method comprising applying the sample onto a gel made of graphene oxide co-doped with boron nitrogen, the gel having B—N bonds, the gel being functionalized with the receptor, the receptor being adapted to react with an analyte, the analyte being a molecule, the gel having a 3D structure, the method further comprising measuring an electrical characteristic of the gel during contact with the sample, and determining the presence of the analyte in the sample based on a change in the electrical characteristic, wherein the receptor is an amine-terminate receptor.

2. The method of claim 1, wherein the gel forms a channel of a field effect transistor, and wherein said measuring is performed with the field effect transistor.

3. The method of claim 1 wherein the gel has at least 50% B—N bonds, less than 40% B—C bonds, at least 5% Pyridinic N bonds, less than 70% C—N—B bonds, less than 20% Pyrrolic N bonds.

4. The method of claim 3, wherein the gel comprises at least 15% Pyridinic N bonds.

5. The method of claim 3, wherein the gel comprises less than 60% C—N—B bonds.

6. The method of claim 3, wherein the gel comprises 0% Pyrrolic N bonds.

7. The method of claim 3 wherein the gel has an ON and OFF current ratio of between $10^8$ and $10^5$ cm$^2$V$^{-1}$s$^{-1}$.

8. The method of claim 7 wherein the ON and OFF current ratio is between $10^8$ cm$^2$V$^{-1}$s$^{-1}$ and $10^6$ cm$^2$V$^{-1}$s$^{-1}$.

9. A method of detecting a presence of an analyte adapted to a receptor in a sample, the method comprising applying the sample onto a gel made of graphene oxide co-doped with boron nitrogen, the gel having B—N bonds, the gel being functionalized with the receptor, the receptor being adapted to react with an analyte, the analyte being a molecule, the gel having a 3D structure, the method further comprising measuring an electrical characteristic of the gel during contact with the sample, and determining the presence of the analyte in the sample based on a change in the electrical characteristic, wherein the gel further has a passivation agent, wherein the gel has carboxyl functional groups, the carboxyl functional groups functionalizing the receptor onto the gel, wherein the passivation agent is configured to bind with excess carboxyl functional groups.

10. A method of detecting a presence of an analyte adapted to a receptor in a sample, the method comprising applying the sample onto a gel made of graphene oxide co-doped with boron nitrogen, the gel having B—N bonds, the gel being functionalized with the receptor, the receptor being adapted to react with an analyte, the analyte being a molecule, the gel having a 3D structure, the method further comprising measuring an electrical characteristic of the gel during contact with the sample, and determining the presence of the analyte in the sample based on a change in the electrical characteristic, wherein the gel further has a dielectric.

* * * * *